United States Patent
Sato

(10) Patent No.: US 8,259,325 B2
(45) Date of Patent: Sep. 4, 2012

(54) DATA COMMUNICATION APPARATUS AND DATA PROCESSING METHOD FOR CONTROLLING TRANSMISSION OF A PRINT COMPLETION NOTIFICATION

(75) Inventor: Eiichi Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1022 days.

(21) Appl. No.: 11/862,007

(22) Filed: Sep. 26, 2007

(65) Prior Publication Data
US 2008/0239371 A1    Oct. 2, 2008

(30) Foreign Application Priority Data
Sep. 29, 2006   (JP) ................................. 2006-267307

(51) Int. Cl.
G06F 3/12      (2006.01)
G06F 15/16     (2006.01)
(52) U.S. Cl. ........ 358/1.15; 709/206; 709/224; 358/406
(58) Field of Classification Search ................. 358/1.15, 358/402, 407, 406; 709/200, 206, 224
See application file for complete search history.

(56) References Cited

U.S. PATENT DOCUMENTS

| | | | | |
|---|---|---|---|---|
| 5,057,955 A * | 10/1991 | Inagoya et al. | ............... | 360/121 |
| 5,881,233 A | 3/1999 | Toyoda | | |
| 6,021,427 A * | 2/2000 | Spagna et al. | ............... | 709/206 |
| 6,567,743 B1 * | 5/2003 | Mueller et al. | ............... | 701/209 |
| 6,799,212 B1 * | 9/2004 | Iyoki | ............... | 709/224 |
| 6,898,625 B2 * | 5/2005 | Henry et al. | ............... | 709/206 |
| 7,375,835 B1 * | 5/2008 | Hull et al. | ............... | 358/1.15 |
| 7,957,036 B2 * | 6/2011 | Nagata et al. | ............... | 358/402 |
| 8,028,027 B2 * | 9/2011 | Reddy et al. | ............... | 709/206 |
| 8,086,681 B2 * | 12/2011 | Ochi | ............... | 709/206 |
| 2002/0036797 A1 * | 3/2002 | Yamamoto | ............... | 358/1.15 |
| 2002/0116508 A1 * | 8/2002 | Khan et al. | ............... | 709/229 |
| 2002/0131070 A1 * | 9/2002 | Housel et al. | ............... | 358/1.15 |
| 2003/0163574 A1 | 8/2003 | Tohki | | |
| 2003/0233421 A1 | 12/2003 | Shibata | | |
| 2006/0066889 A1 * | 3/2006 | Asano et al. | ............... | 358/1.15 |
| 2010/0304768 A1 * | 12/2010 | Murtagh et al. | ............... | 455/466 |

FOREIGN PATENT DOCUMENTS

| | | |
|---|---|---|
| CN | 1476230 A | 2/2004 |
| EP | 1102473 A2 | 5/2001 |
| JP | 08-130554 A | 5/1996 |
| JP | 2003-122682 A | 4/2003 |
| JP | 2005-107741 A | 4/2005 |
| JP | 2005-173642 A | 6/2005 |

OTHER PUBLICATIONS

Alan Schwartz, Managing Mailing List System, O'Reilly Japan, Inc., 2000, p. 54-57.

* cited by examiner

Primary Examiner — Twyler Haskins
Assistant Examiner — Dennis Dicker
(74) Attorney, Agent, or Firm — Canon USA Inc IP Division

(57) ABSTRACT

In a data communication apparatus having a printing function of printing, for example, received emails, and a function of transmitting print completion notifications, if received data is a print completion notification, it may be printed out, but a print completion notification indicating that the printing of the received data has been completed is not transmitted. Then, wasteful transmission of print completion notifications is prevented. Alternatively, the printing itself of the received data is inhibited, which prevents wasteful consumption of printing resources.

5 Claims, 19 Drawing Sheets

FIG. 20

MEMORY MAP OF STORAGE MEDIUM

STORAGE MEDIUM, SUCH AS FD, CD-ROM

| DIRECTORY INFORMATION |
|---|
| FIRST DATA PROCESSING PROGRAM |
| PROGRAM CODE SET CORRESPONDING TO STEPS OF FLOWCHART IN FIG. 10 |
| SECOND DATA PROCESSING PROGRAM |
| PROGRAM CODE SET CORRESPONDING TO STEPS OF FLOWCHART IN FIG. 12 |
| THIRD DATA PROCESSING PROGRAM |
| PROGRAM CODE SET CORRESPONDING TO STEPS OF FLOWCHART IN FIG. 14 |
| FOURTH DATA PROCESSING PROGRAM |
| PROGRAM CODE SET CORRESPONDING TO STEPS OF FLOWCHART IN FIG. 15 |
| FIFTH DATA PROCESSING PROGRAM |
| PROGRAM CODE SET CORRESPONDING TO STEPS OF FLOWCHART IN FIG. 17 |
| SIXTH DATA PROCESSING PROGRAM |
| PROGRAM CODE SET CORRESPONDING TO STEPS OF FLOWCHART IN FIG. 19 |
| |

DATA COMMUNICATION APPARATUS AND DATA PROCESSING METHOD FOR CONTROLLING TRANSMISSION OF A PRINT COMPLETION NOTIFICATION

BACKGROUND OF THE INVENTION

1. Field of the Invention

The present invention relates to a control method for controlling the transmission of a print completion notification when a printing operation for received data has been completed.

2. Description of the Related Art

A system in which a user is notified of the completion of a print job by electronic mail (email) is known (e.g., Japanese Patent Laid-Open No. 2005-107741). A system in which received email is printed is also known (e.g., U.S. Pat. No. 5,881,233).

A typical known system for printing email and notifying a user of the completion of printing is described below with reference to FIG. 21.

FIG. 21 illustrates a computer 2101, which is a printing client, and an image forming apparatus 2102 that executes print commands. The computer 2101 is operated by an operator. The operator operates an email application installed in the computer 2101 to compose an email. An image file that the operator wishes to print is attached to the email. It is necessary to set the email address of the image forming apparatus 2102 in email address information.

Upon completing the formation of the email, the operator sends the email to the image forming apparatus 2102 to issue a print command 2103. The email reaches the image forming apparatus 2102 via relay devices, such as a hub, a router, and a mail server in a network.

The image forming apparatus 2102 extracts the image file attached to the received email and expands the image file into a raster image, and then performs print processing.

The image forming apparatus 2102 also has an email message printing function, and if text is included in the received email message, it also prints out the text.

The image forming apparatus 2102 has the function of sending a print completion notification 2104 by email after completing the printing of a print job instructed by the print command 2103. The message and the subject of the email include information concerning the completion of printing of the print job instructed by the print command 2103. Accordingly, upon receiving and viewing the email with an email application, the operator of the computer 2101 can be informed that the print job requested by the operator has successfully been output to the image forming apparatus 2102.

In addition to the function of sending a print completion notification, the image forming apparatus 2102 has the function of sending a print abnormality termination notification or a print rejection notification by email. By using this function, the image forming apparatus 2102 can notify the sender of a print job that printing has been terminated due to the occurrence of an abnormality in the image forming apparatus 2102 or that a print command has been rejected by the image forming apparatus 2102. In this case, information concerning such notification is included in the message and the subject of the email, and the email is sent from the image forming apparatus 2102 to the sender of the print job.

The operation performed by an image forming system including a first image forming apparatus and a second image forming apparatus is described below. The first image forming apparatus can receive print commands by email and also has a scanning function of scanning images and an email sending function of forming scanned image data into a file and attaching it to an email and sending it. The second image forming apparatus can receive print commands by email and also send print completion notifications by email.

A specific example of such an image forming system is described below with reference to FIG. 22. FIG. 22 illustrates an example of a known image forming system that can send print commands and print completion notifications by email.

In FIG. 22, an image forming apparatus 211 (first image forming apparatus) has a scanning function of scanning an image placed on a document stand and then forming the scanned image data into a file in a prescribed image format. The image forming apparatus 211 also has an email sending function of attaching the file to an email and sending it.

An image forming apparatus 212 (second image forming apparatus) can receive print commands by email. Thus, after the image forming apparatus 211 sends an email to the image forming apparatus 212 (second image forming apparatus) by using the email sending function, the image forming apparatus 212 processes this email as a print command 213.

Upon receiving the print command 213, the image forming apparatus 212 extracts the image file attached to the received email and expands the image file into a raster image, and then performs print processing. The image forming apparatus 212 also has the function of printing an email message, and if text is included in the received email message, it also prints out the text.

Upon completion of printing a print job instructed by the print command 213, the image forming apparatus 212 sends a print completion notification 214 by email. Information concerning the completion of printing the print job is included in the message and the subject of the email.

Upon receiving the print completion notification 214, the image forming apparatus 211 extracts the email message including the print completion notification 214 and prints it out by using the email printing function of the image forming apparatus 211. In this manner, the email message including the print completion notification 214 sent from the image forming apparatus 212 can be printed out by the image forming apparatus 211 that has sent the print job by email.

If the image forming apparatus 212 sends a print abnormality termination notification or a print rejection notification by email, an email message including such a notification is printed out by the image forming apparatus 211.

In the image forming system of the related art in which print completion notifications are printed as described above, such as that in FIG. 22, a print completion notification is always printed out by the email printing function provided for the image forming apparatus 211, although it is sent to the computer 2101, assuming that it will be merely viewed by the use of an email application installed in the computer 2101.

Accordingly, every time the image forming apparatus 211 uses the email sending function, the consumption of paper or toner results, which is not desirable in terms of cost and labor for users who do not wish to print out such a print completion notification.

Generally, various devices, such as servers, computers, multifunction devices, printers, and scanners, are connected to a network, and thus, devices that send print commands by email to an image forming apparatus vary.

Thus, a controller may be provided for controlling that print completion notifications are sent from the image forming apparatus to all devices that have requested print commands or that such notifications are not sent to any device. However, such a controller cannot meet various user needs, and instead, it may inconvenience some users.

If both the image forming apparatuses 211 and 212 have the function of transmitting print completion notifications and can also receive print commands by email, the following problem is encountered. After the image printing apparatus 211 prints out a print completion notification received from the image printing apparatus 212, it may send another print completion notification indicating the completion of the printing of the received print completion notification to the image forming apparatus 212. As a result, emails including print completion notifications are endlessly sent and received between the image forming apparatuses 211 and 212 as chain mail. This may adversely influence the traffic of a network or may wastefully consume paper or recording agent.

SUMMARY OF THE INVENTION

The present invention provides a data communication apparatus and a data processing method free from the above-described problems.

The present invention also provides a mechanism for preventing wasteful communication of print completion notifications.

According to an aspect of the present invention, a data communication apparatus is provided which includes a receiver adapted to receive electronic mail data from a transmitter; a printer adapted to print an image based on the electronic mail data received by said receiver; a notification unit adapted to transmit a notification indicating a completion of a printing of the image based on the electronic mail data by said printer to the transmitter; and a determination unit adapted to determine whether the notification is to be transmitted by said notification unit based on the electronic mail data received by said receiver. The notification unit transmits the notification in a case where said determination unit determines that the notification is to be transmitted.

According to another aspect of the present invention, a data processing method is provided which includes receiving electronic mail data from a transmitter; printing an image based on the received electronic mail data; transmitting a notification indicating a completion of a printing of the image based on the electronic mail data to the transmitter; and determining whether the notification is to be transmitted based on the received electronic mail data.

The above described features and aspects of the present invention will become apparent from the following description of exemplary embodiments with reference to the attached drawings.

BRIEF DESCRIPTION OF THE DRAWINGS

FIG. 20 illustrates a memory map of a storage medium (recording medium) storing various data processing programs readable by an image forming apparatus according to an embodiment of the present invention.

DESCRIPTION OF THE EMBODIMENTS

Embodiments of the present invention are described below in detail with reference to the accompanying drawings. The following embodiments are examples only, and do not intend to limit the scope of the invention.

First Exemplary Embodiment

Figure 1:
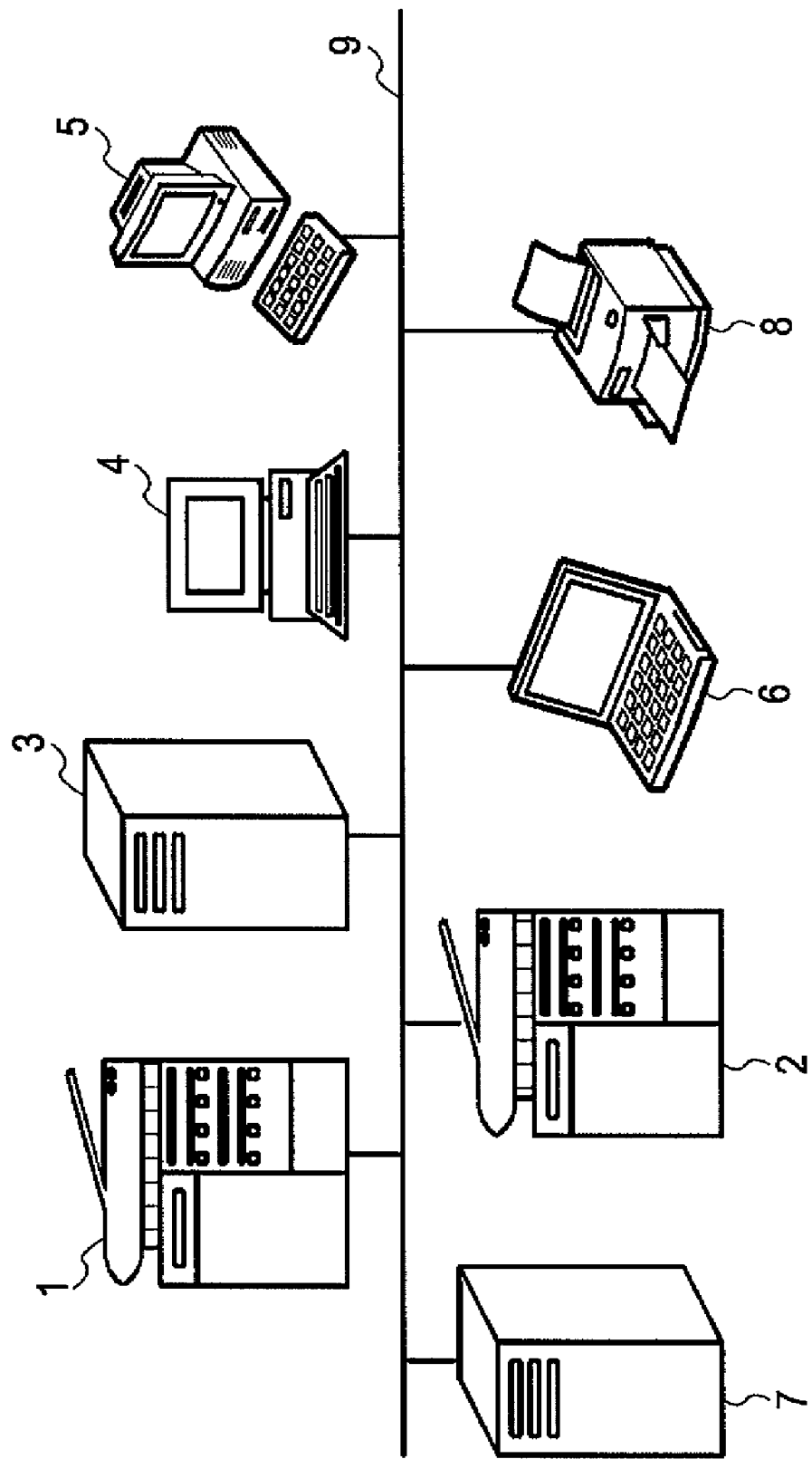
FIG. 1 is a schematic view illustrating an example of the configuration of a network system including image forming apparatuses configured in accordance with a first embodiment of the present invention.

FIG. 1 is a schematic view illustrating the configuration of a network system including image forming apparatuses configured in accordance with a first embodiment of the present invention.

The network system shown in FIG. 1 includes image forming apparatuses 1 and 2 configured in accordance with an embodiment of the present invention, and various devices, such as a file server 3, computers 4 and 5, a notebook personal computer (PC) 6, a mail server 7, and a printer 8. The above-described elements are connected to a network (local area network (LAN)) 9.

The image forming apparatuses 1 and 2 can receive print commands by email. In this case, a known reception protocol, such as post office protocol version 3 (POP3) or simple mail transfer protocol (SMTP), can be used. An image file to be printed is sent by email from any of the computers 4 and 5 and the notebook PC 6 to the email address of the image forming apparatus 1 or 2, and the image forming apparatus 1 or 2 performs print processing for the image file attached to the received email and the email message.

The image forming apparatuses 1 and 2 can also send print completion notifications by email. In this case, as a transmission protocol, SMTP can be used. Upon completing the above-described print processing, the image forming apparatus 1 or 2 sends a print completion notification by email to the sender of the print job. Accordingly, the operator who has instructed a printing operation by email by operating the computer 4 or 5 or the notebook PC 6 can be informed that the print job instructed by the print command issued by the operator has successfully been output to the image forming apparatus 1 or 2.

In addition to a print completion notification, the image forming apparatus 1 or 2 can send a print abnormality termination notification or a print rejection notification by email.

In this embodiment, the image forming apparatus 1 can read image data from a document and forms the read image data into an image file, and then attaches the image file to email and sends it. In this case, SMTP can be used as a transmission protocol. Upon receiving a print command from the image forming apparatus 1 by email, the image forming apparatus 2 can execute print processing for the image file attached to the email and the email message. Upon completion of the printing operation, the image forming apparatus 2 can send a print completion notification to the image forming apparatus 1 by email.

The configuration of the image forming apparatus 1 or 2 shown in FIG. 1 is herein now discussed below with reference to FIGS. 2 through 5.

Figure 2:
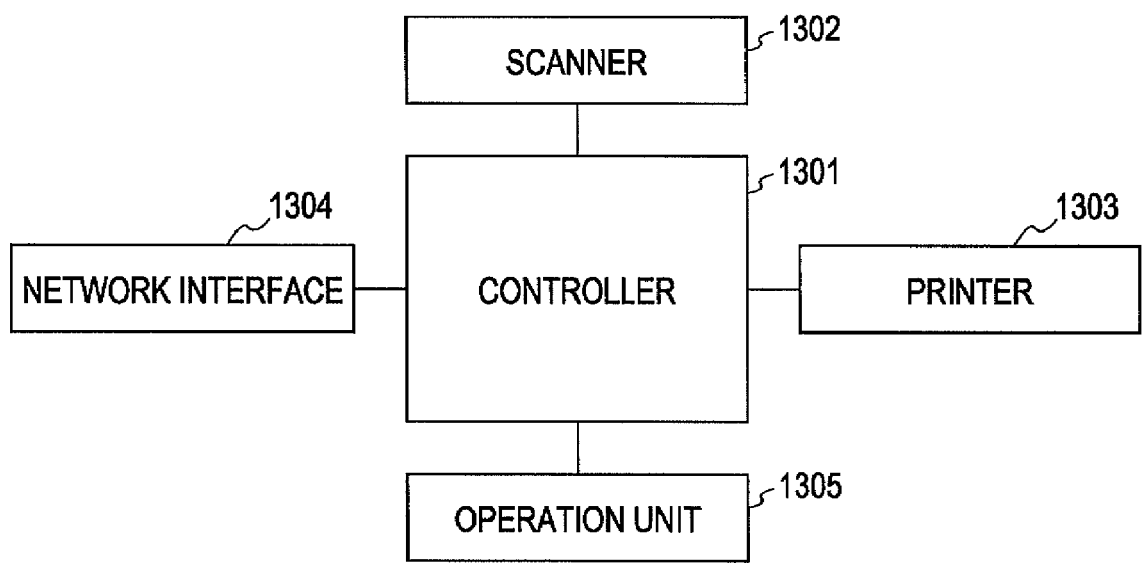
FIG. 2 is a block diagram illustrating an example of the configuration of the image forming apparatuses shown in FIG. 1.

FIG. 2 is a block diagram illustrating an example of the configuration of the image forming apparatus 1 or 2 shown in FIG. 1. In FIG. 2, the image forming apparatus 1 or 2 is a multifunction peripheral (MFP) by way of example.

Referring to FIG. 2, the image forming apparatus 1 or 2 includes a controller 1301, a scanner 1302, a printer 1303, a network interface 1304, and an operation unit 1305. The controller 1301 controls the MFP.

Figure 3:
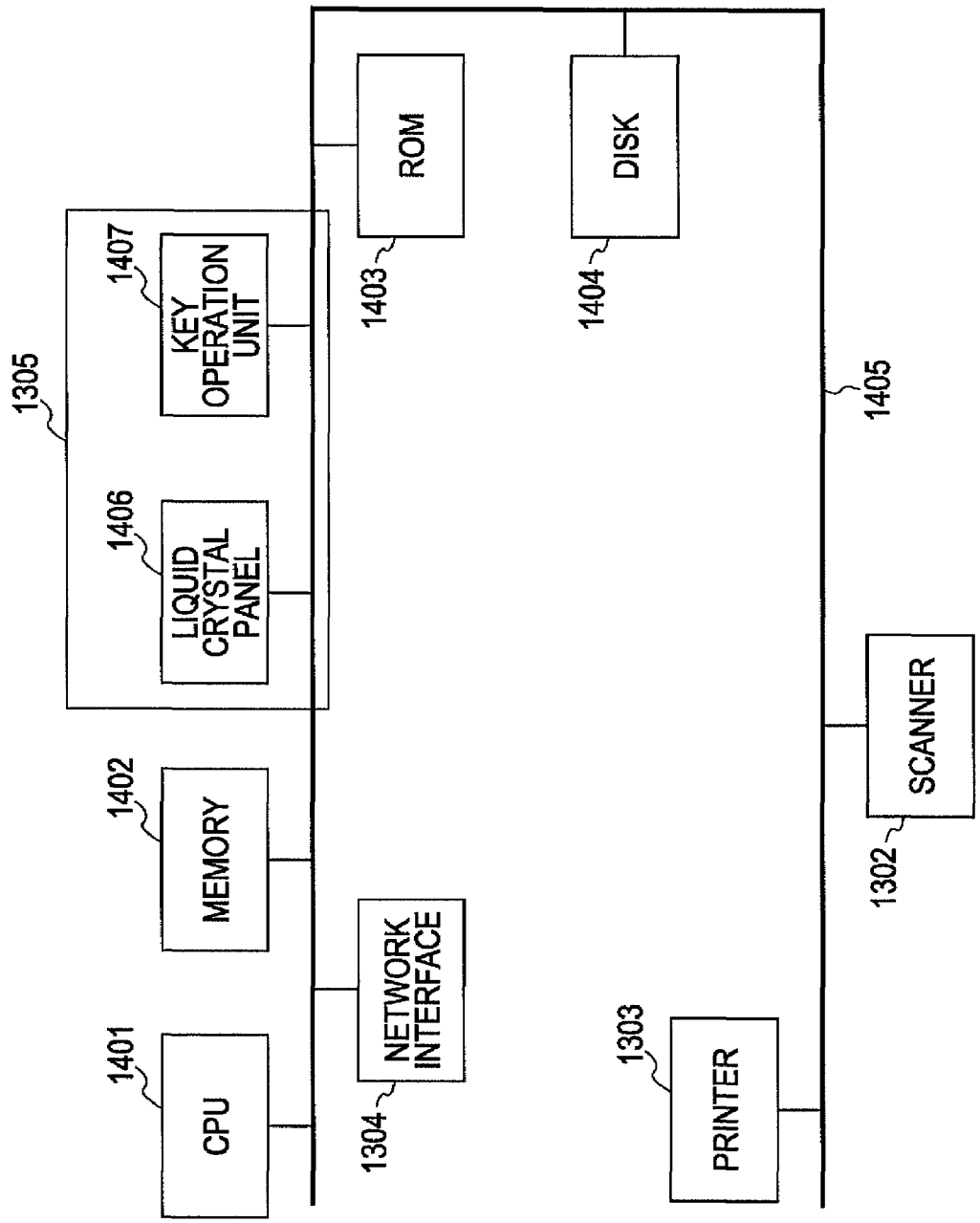
FIG. 3 is a block diagram illustrating the hardware configuration of a controller shown in FIG. 2.

An example hardware configuration of the controller 1301 is shown in FIG. 3. The scanner 1302 and the printer 1303 are controlled by the controller 1301. The network interface 1304 provides two-way communication with a network (for example, Ethernet) via the network interface 1304. By using this function, the controller 101 can perform two-way communication.

The operation unit 1305 includes, as shown in FIG. 3, a liquid crystal display with a touch panel (hereinafter simply referred to as the "liquid crystal panel") 1406 and a key operation unit 1407. The operation unit 1305 displays information supplied from the controller 1301 and also sends user instructions to the controller 1301.

Now referring to FIG. 3 there is provided a block diagram illustrating the hardware configuration of the controller 1301 shown in FIG. 2. In FIG. 3, the same elements as those shown in FIG. 2 are designated with like reference numerals.

The controller 1301 includes, as shown in FIG. 3, a central processing unit (CPU) 1401, a memory 1402, a read only memory (ROM) 1403, a disk 1404, such as a storage medium, e.g., a hard disk, and a bus 1405. The CPU 1401 is connected to the memory 1402, the ROM 1403, and the disk 1404 via the bus 1405.

Various programs and data executed by the CPU 1401 are stored in the disk 1404, and if necessary, such data are sequentially read to the memory 1402 and are executed by the CPU 1401.

The disk 1404 may be an external disk that is detachably attached to the MFP or may be built in the MFP. The programs may be downloaded from another device via a network and stored in the disk 1404.

The liquid crystal panel 1406 forming part of the operation unit 1305 is connected to the CPU 1401 with the bus 1405 therebetween. The liquid crystal panel 1406 and the key operation unit 1407 form the operation unit 1305, and the CPU 1401 sends data to the liquid crystal panel 1406 to display the data on the liquid crystal panel 1406. The CPU 1401 also reads out data from the liquid crystal panel 1406 and the key operation unit 1407 to input user instructions.

The network interface 1304 is connected to the bus 1405. The CPU 1401 reads or writes data from or to the network interface 1304 to perform communication using the network interface 1304.

The printer 1303 and the scanner 1302 are also connected to the bus 1405. The CPU 1401 reads or writes data from or to the engine of the printer 1303 or the scanner 1302 to perform an operation, such as printing or scanning, and obtains various statuses. Instead of being built into the MFP, the printer 1303 or the scanner 1302 may be disposed on a network as an independent device and may be controlled by the controller 1301 of the MFP.

Figure 4:
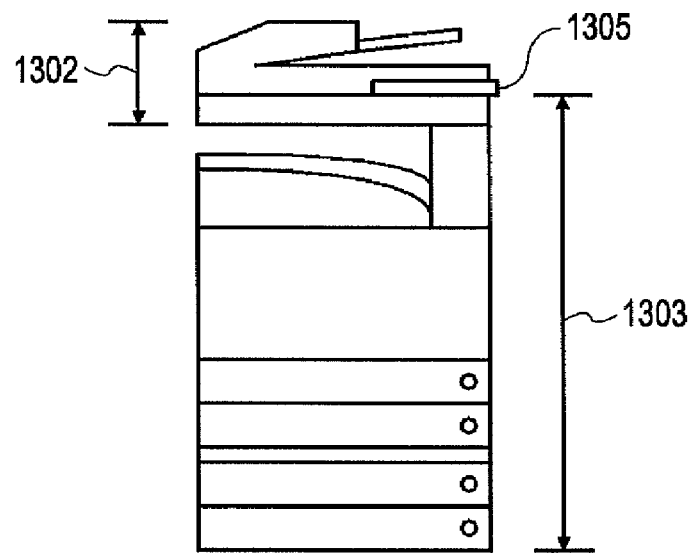
FIG. 4 is an external view illustrating the image forming apparatuses shown in FIG. 1.

FIG. 4 is an external view illustrating the image forming apparatus 1 or 2 shown in FIG. 1. In FIG. 4, the same elements as those shown in FIG. 2 or 3 are designated with like reference numerals.

In FIG. 4, the scanner 1302, which serves as an image input device, illuminates an image formed on paper, which is a document, and scans the image with a charge-coupled device (CCD) sensor to convert the image into an electric signal as raster image data.

The printer 1303, which serves as an image output device, converts the raster image data into the identical image formed on paper. The start or stop of the printing operation is initiated by an instruction given from the controller 1301. The image forming apparatus also includes an operation unit 1305.

Figure 5:
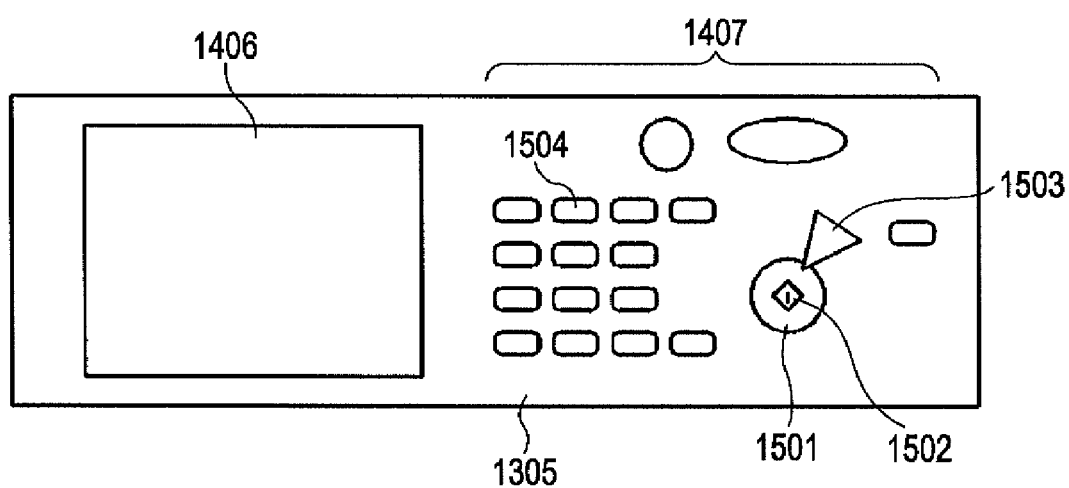
FIG. 5 is a plan view illustrating an example of an operation unit shown in FIGS. 2 through 4.

FIG. 5 is a plan view illustrating an example of the operation unit 1305 shown in FIGS. 2 through 4, and, in FIG. 5, the same elements as those shown in FIG. 3 are designated with like reference numerals.

In FIG. 5, on the liquid crystal panel 1406, a touch panel sheet is attached onto the liquid crystal display, and the liquid crystal panel 1406 displays the operation screen and soft keys of the system. In response to an operation performed on a key displayed on the liquid crystal display, the liquid crystal panel 1406 sends position information concerning the position of the operated key to the controller 1401.

The key operation unit 1407 shown in FIG. 5 includes a start key 1501, a two-color light-emitting device (LED) 1502 including red and green colors, a stop key 1503, and a numerical keypad 1504. The start key 1501 is used when starting a reading operation on an image formed on a document. The two-color LED 1502 is disposed at the center of the start key

1501, and indicates by the color, i.e., red or green, whether the start key 1501 is ready to be used.

The stop key 1503 is used when suspending the operation. The numerical keypad 1504 includes numerical and letter buttons, and is used for setting the number of copies or switching screens of the liquid crystal panel 1406.

The first exemplary embodiment is described in greater detail with reference to FIGS. 6 through 10 in the following context. Image data is read from a document and is formed into an image file by the image forming apparatus 1 and the image file is sent by email to the image forming apparatus 2, and the email is received by the information forming apparatus 2. An email with an image file sent from the image forming apparatus 1 is hereinafter referred to as an "email print command".

Figure 6:
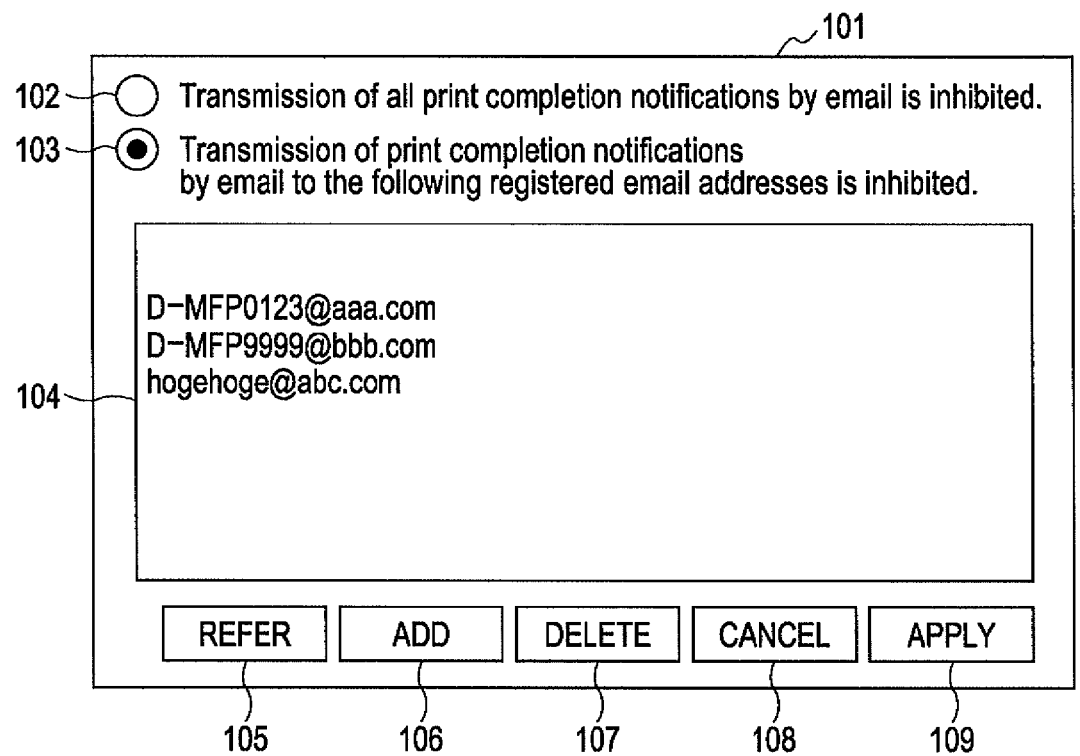
FIG. 6 is a schematic view illustrating a user interface for controlling email transmission of a print completion notification in the first embodiment.

FIG. 6 is a schematic diagram illustrating a user interface for controlling the transmission of print completion notifications by email in the first embodiment.

In FIG. 6, reference numeral 101 designates a user interface screen for controlling the transmission of a print completion notification by email. The user interface screen 101 is displayed on a user interface, i.e., on the liquid crystal panel 1406 of the operation unit 1305, provided for the image forming apparatus 2, i.e., the receiver of the email print command. When the user operates the operation unit 1305 of the image forming apparatus 2, the content of the user operation is reflected on the user interface screen 101 under the control of the CPU 1401 of the image forming apparatus 2.

The user interface screen 101 includes a user interface portion 102 that inhibits the transmission of all print completion notifications from the image forming apparatus 2 and a user interface portion 103 that inhibits the transmission of print completion notifications from the image forming apparatus 2 only to registered addresses.

In a window screen 104, a list of addresses to which print completion notifications are not transmitted by email (such a list is hereinafter referred to as a "print-completion-notification transmission inhibiting list") is displayed. A refer button 105 is used for displaying a list of addresses that can be viewed from the image forming apparatus 2. An add button 106 is used for registering a new address to which print completion notifications are not transmitted.

A delete button 107 is used for deleting registered addresses to which print completion notifications are not transmitted. A cancel button 108 is used for canceling the content set on the user interface screen 101. An apply button 109 is used for applying the content set on the user interface screen 101.

By operating the user interface shown in FIG. 6, the operator of the image forming apparatus 2 can make settings for each address as to whether to transmit a print completion notification by email.

The operator can refer to email addresses that can be viewed from the image forming apparatus 2 by operating the refer button 105. In response to the operation performed on the refer button 105, the CPU 1401 of the image forming apparatus 2 controls an address book screen 201 shown in FIG. 7 to be displayed on the liquid crystal panel 1406 of the image forming apparatus 2. The address book screen 201 is described below with reference to FIG. 7.

Figure 7:
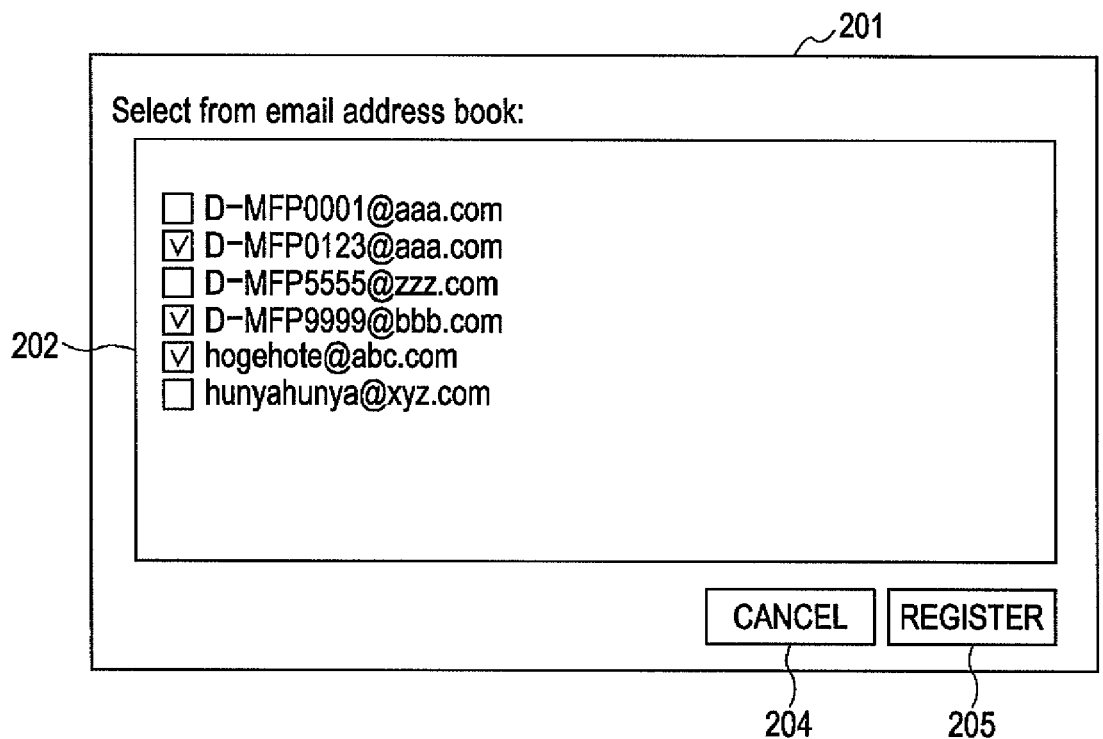
FIG. 7 is a schematic view illustrating an example of an address book screen in the first embodiment.

FIG. 7 is a schematic view illustrating an example of the address book screen 201 used in the first embodiment. On the address book screen 201 shown in FIG. 7, a window screen 202 is shown in which a list of addresses that can be viewed from the image forming apparatus 2 is displayed. The operator selects (checks), from the address list, addresses to which the operator does not wish to transmit print completion notifications, and then operates the register button 205. Then, the CPU 1401 of the image forming apparatus 2 closes the address book screen 201 and controls the addresses registered in the address book screen 201 to be displayed in the window screen 104. Also, the screen 201 includes a cancel button 204.

Referring back to a description of FIG. 6, the operator can directly specify an address to which he/she does not wish to transmit a print completion notification by operating the add button 106 shown in FIG. 6. In response to the operation performed on the add button 106, the CPU 1401 of the image forming apparatus 2 controls an address input screen 301 shown in FIG. 8 to be displayed on the liquid crystal panel 1406 of the image forming apparatus 2. The address input screen 301 is described below with reference to FIG. 8.

Figure 8:
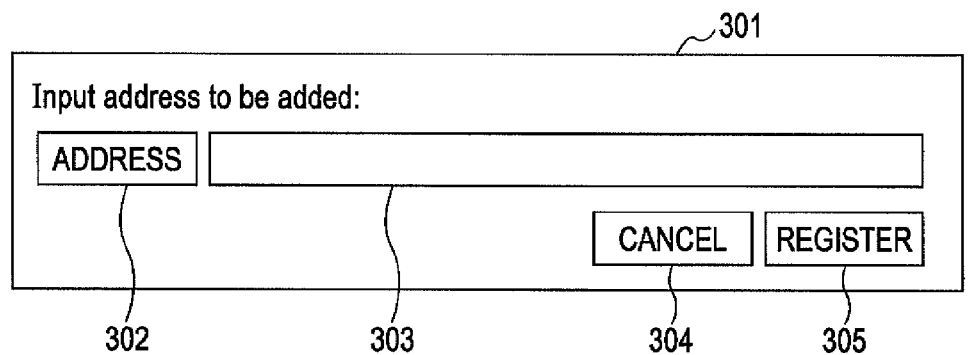
FIG. 8 is a schematic view illustrating an example of an address input screen in the first embodiment.

FIG. 8 is a schematic view illustrating an example of the address input screen 301 used in the first embodiment. On the address input screen 301 shown in FIG. 8, if the operator operates an address button 302, a virtual keyboard is displayed on the liquid crystal panel 1406 to allow the operator to input an address manually. In response to the input of an address by the operator, the CPU 1401 of the image forming apparatus 2 controls the input address to be displayed on an address display screen 303. After checking the address displayed on the address display screen 303, the operator operates a register button 305. Then, the CPU 1401 of the image forming apparatus 2 closes the address input screen 301 and controls the address registered on the address input screen 301 to be displayed in the window screen 104. Also, the screen 201 includes a cancel button 304.

Referring back to a description of FIG. 6, the operator can delete an address registered as an address to which a print completion notification is not transmitted by operating the delete button 107. In response to the operation performed on the delete button 107, the CPU 1401 of the image forming apparatus 2 controls an address delete screen 401 shown in FIG. 9 to be displayed on the liquid crystal panel 1406 of the image forming apparatus 2. The address delete screen 401 is described below with reference to FIG. 9.

Figure 9:
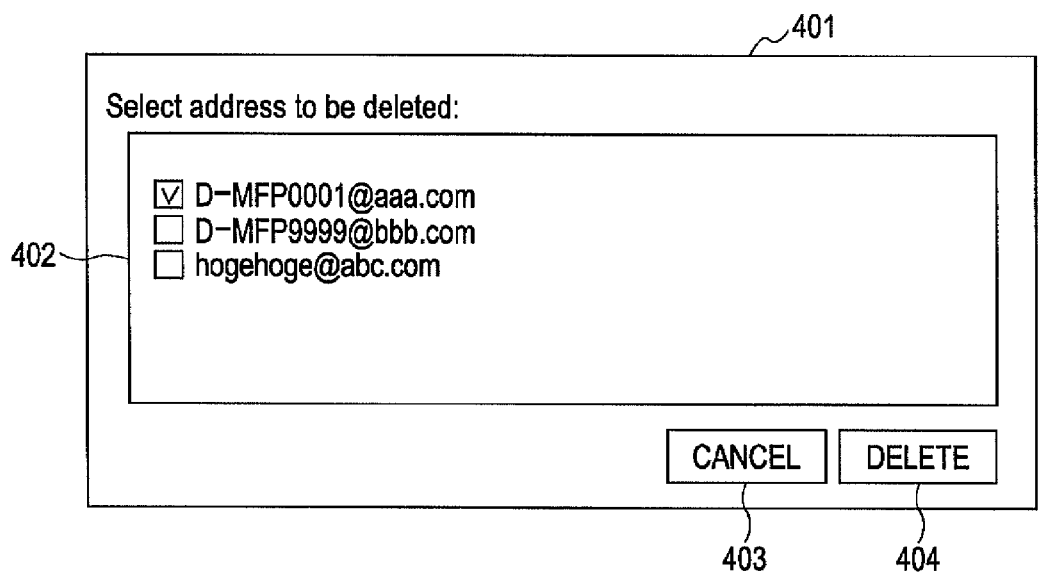
FIG. 9 is a schematic view illustrating an example of an address delete screen in the first embodiment.

FIG. 9 is a schematic view illustrating an example of the address delete screen 401 used in the first embodiment. On the address delete screen 401 shown in FIG. 9, a window screen 402 is shown in which a print-completion-notification transmission inhibiting list is displayed, and the window screen 402 is displayed under the control of the CPU 1401 of the image forming apparatus 2. The operator selects (checks) an address to be deleted from the print-completion-notification transmission inhibiting list, and operates a delete button 404. Then, the CPU 1401 of the image forming apparatus 2 closes the address delete screen 401 and controls the deleted address not to be displayed on the window screen 104. Also, the screen 401 includes a cancel button 403.

Referring back to a description of FIG. 6, the operator can cancel the content set on the user interface screen 101 shown in FIG. 6 by operating the cancel button 108. In response to the operation performed on the cancel button 108, the CPU 1401 of the image forming apparatus 2 controls the content set on the user interface screen 101 to be canceled.

The operator can also apply the content set on the user interface screen 101 by operating the apply button 109. In response to the operation performed on the apply button 109, the CPU 1401 of the image forming apparatus 2 controls the content of the settings of print-completion-notification transmission inhibiting addresses to be registered (stored) in the disk 1404. In this case, the content of the settings are registered as information indicating that the transmission of a print completion notification is inhibited (hereinafter referred to as the "print-completion-notification transmission inhibiting setting information").

Figure 10:
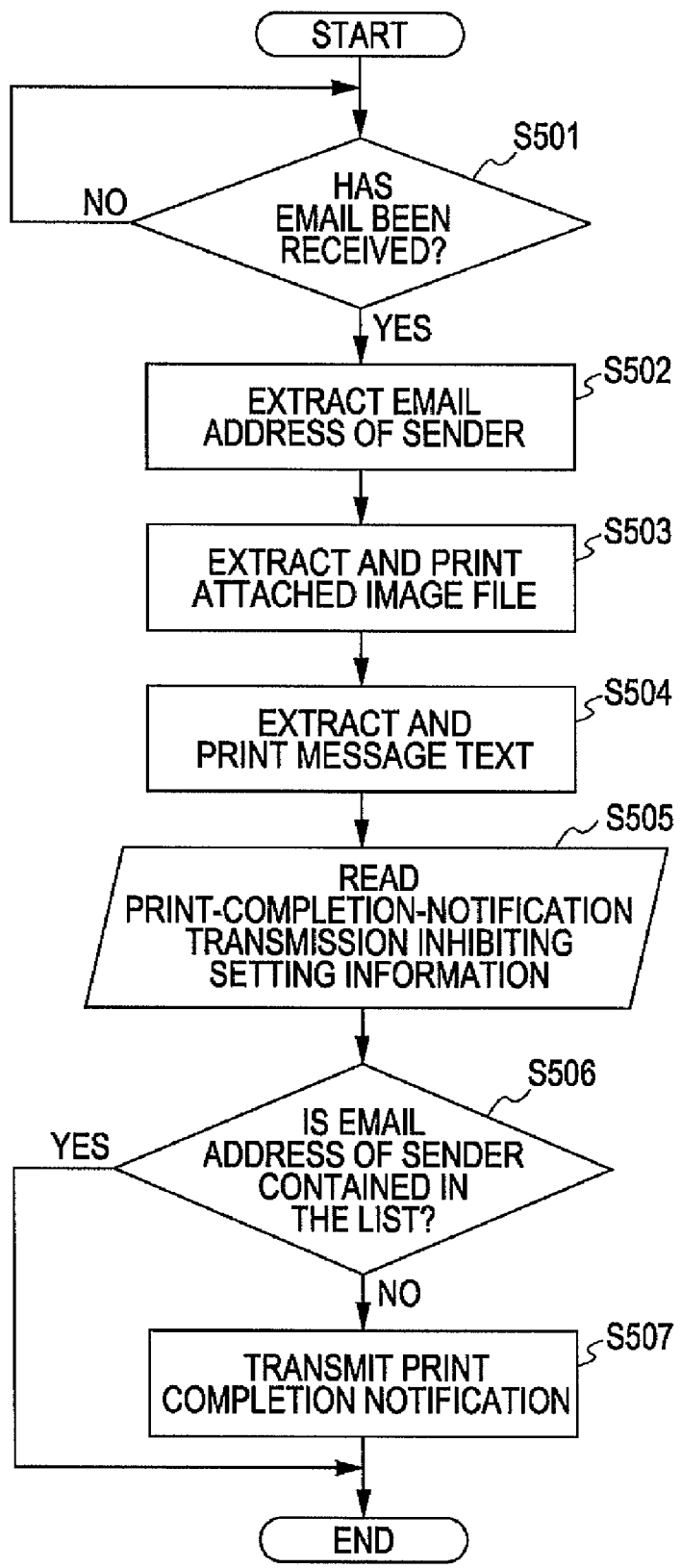
FIG. 10 is a flowchart illustrating an example of a first control process according to the first embodiment of the present invention.

A detailed description is given, with reference to the flowchart in FIG. 10, of a practical application of a print-completion-notification transmission inhibiting list to actual print processing performed by email.

FIG. 10 is a flowchart illustrating an example of a first control process according to the first embodiment of the present invention. The first control process corresponds to control processing for inhibiting the image forming apparatus 2 from transmitting print completion notifications by email. This processing can be performed by the CPU 1401 by reading and executing a corresponding program stored in the ROM 1403 or the disk 1404. In FIG. 10, S501 through S507 represent steps of this processing.

After placing a document on the document stand of the scanner 1302 of the image forming apparatus 1, the operator operates the operation unit 1305 to give an instruction to start sending email. Then, the CPU 1401 of the image forming apparatus 1 performs control to implement the following operation. The document placed on the document stand is scanned with the scanner 1302, and then, the scanned image data is formed into an image file and is attached to an email, and finally, the email is sent to the address specified as the destination. The email to which the image file is attached is in conformity with the Multipurpose Internet Mail Extension (MIME) format.

Now referring to FIG. 10. in step S501, the CPU 1401 of the image forming apparatus 2 is in the standby state until an email is received. More specifically, it is determined in step S501 whether an email, such as an email with an image file sent by the above-described image forming apparatus 1, has been received by the image forming apparatus 2. If it is determined that an email has been received, the process proceeds to step S502.

In step S502, the CPU 1401 of the image forming apparatus 2 extracts the address (in this case, the email address of the image forming apparatus 1) of the sender of the email received in step S501. The CPU 1401 of the image forming apparatus 2 temporarily stores the extracted email address in the memory 1402 of the image forming apparatus 2.

Then, in step S503, the CPU 1401 of the image forming apparatus 2 extracts the image file attached to the email received in step S501. The CPU 1401 of the image forming apparatus 2 then generates image data from the extracted image file and converts the image data into a raster image, which is suitable for print processing, and then, executes print processing with the printer 1303.

Then, in step S504, the CPU 1401 of the image forming apparatus 2 extracts the message of the email received in step S501. If the extracted message includes text data, the CPU 1401 of the image forming apparatus 2 also converts the text data into a raster image, which is suitable for print processing, and executes print processing.

Upon completing the print processing, in step S505, the CPU 1401 of the image forming apparatus 2 reads print-completion-notification transmission inhibiting setting information registered in the disk 1404 of the image forming apparatus 2.

Then, in step S506, the CPU 1401 of the image forming apparatus 2 reads the email address of the sender stored in the memory 1402 and compares the sender address with the print-completion-notification transmission inhibiting setting information (i.e., the print-completion-notification transmission inhibiting address list) registered in the disk 1404 of the image forming apparatus 2. It is then determined whether the email address of the sender is contained in the print-completion-notification transmission inhibiting address list. If the email address of the sender is found in the list, the CPU 1401 determines that the transmission of a print completion notification to the sender is inhibited, and completes the processing without transmitting a print completion notification.

In contrast, if it is determined in step S506 that the email address of the sender is not contained in the list, the CPU 1401 of the image forming apparatus 2 determines that the transmission of a print completion notification is not inhibited, and the process then proceeds to step S507.

In step S507, the CPU 1401 of the image forming apparatus 2 performs control so that a print completion notification is transmitted by email to the sender of the email (in this case, the image forming apparatus 1). The processing is then completed.

As described above, it is possible to control, for each email sender, whether to transmit a print completion notification. This makes it possible to transmit print completion notifications only to users who require such notifications. That is, email senders that have sent print commands can refuse to receive print completion notifications, and users that do not wish to receive print completion notifications can inhibit an image forming apparatus that performs print processing from returning print completion notifications. As a result, the congestion of network traffic caused by wasteful transmission of print completion notifications can be solved, and also, printing of print completion notifications in an image forming apparatus, which is an email sender, can be prevented, which would otherwise wastefully consume printing resources, such as paper and recording agent.

Second Exemplary Embodiment

Figure 11:
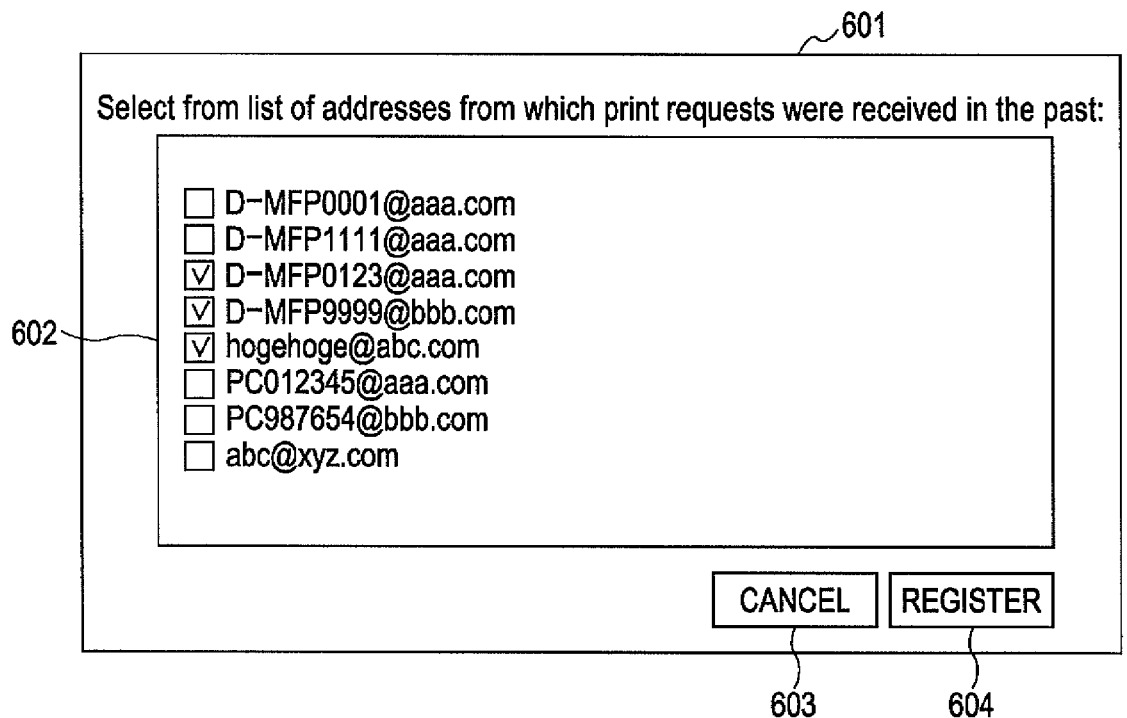
FIG. 11 is a schematic view illustrating an example of an address list screen of addresses from which emails were received in the past in a second embodiment of the present invention.

In a second embodiment of the present invention, when the refer button 105 shown in FIG. 6 is operated, a list of email sender addresses from which the image forming apparatus 2 received emails in the past, such as that shown in FIG. 11, is displayed. Details of the second embodiment are now herein discussed below.

In the second embodiment, the operator operates the refer button 105 of the user interface screen 101 shown in FIG. 6. Then, the CPU 1401 of the image forming apparatus 2 performs control, on the basis of a reception record list stored in the disk 1404 of the image forming apparatus 2, so that an address list screen 601 showing a list of sender addresses from which the image forming apparatus 2 received print commands by email in the past is displayed on the liquid crystal panel 1406 of the image forming apparatus 2. Details of the address list screen 1601 are described below with reference to FIG. 11.

FIG. 11 is a schematic view illustrating an example of the address list screen 601 showing a list of sender addresses from which print commands were received by email in the past.

On the address list screen 601, a window screen 602 is shown in which a list of sender addresses from which the image forming apparatus 2 received print commands by email in the past.

The operator selects (checks) addresses that the operator does not wish to transmit print completion notifications from the list of addresses shown in the window screen 602, and operates a register button 604. In response to this operation, the CPU 1401 of the image forming apparatus 2 closes the address list screen 601 and performs control so that the addresses registered on the address list screen 601 are displayed in the window 104. Also, the screen 601 includes a cancel button 603.

Address registration processing for registering addresses in the reception record list is described below with reference to FIG. 12.

Figure 12:
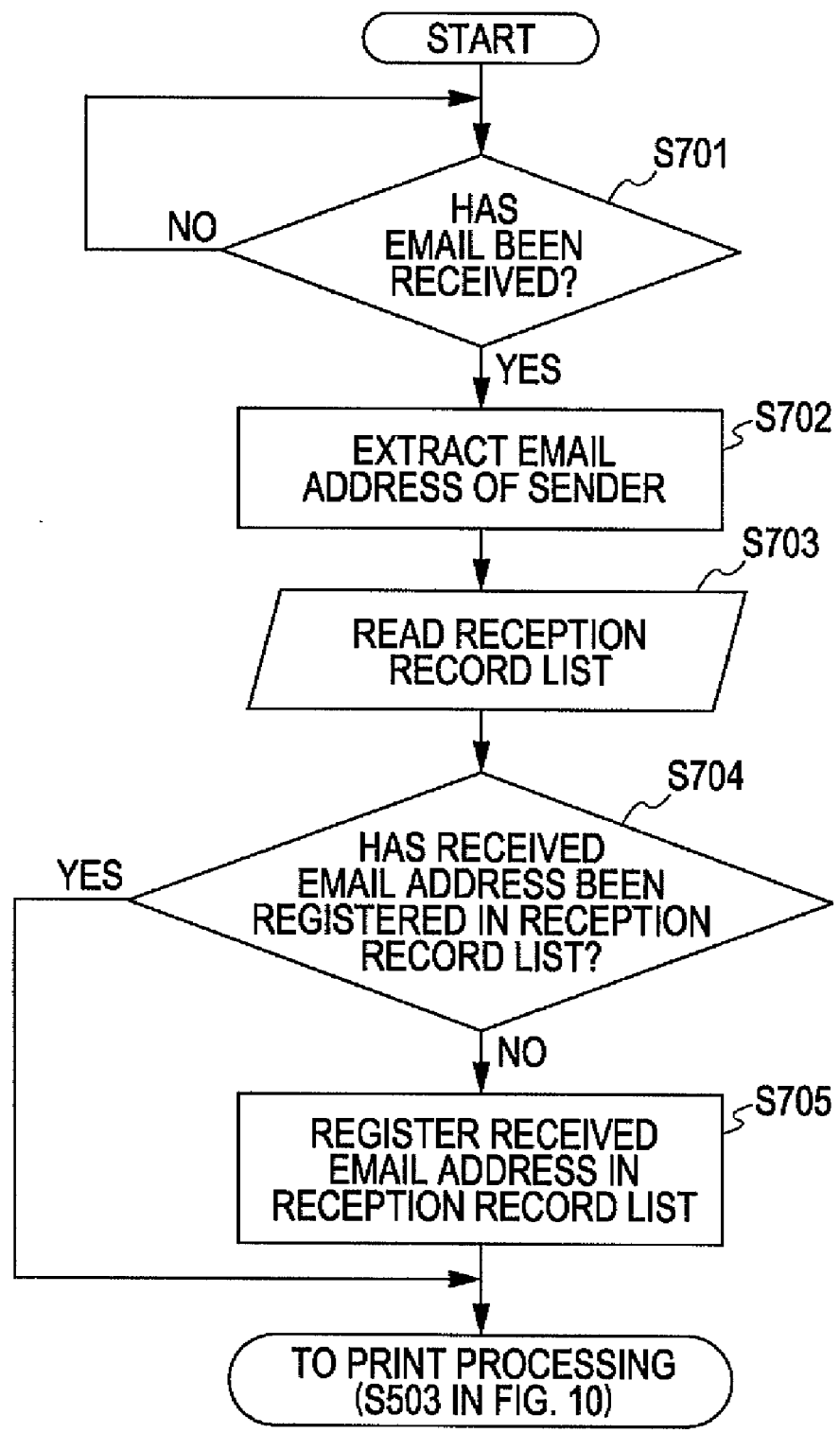
FIG. 12 is a flowchart illustrating an example of a second control process according to the second embodiment of the present invention.

FIG. 12 is a flowchart illustrating an example of a second control process according to the second embodiment of the present invention. The second control process corresponds to address registration processing for registering addresses in the reception record list in the image forming apparatus 2. This processing can be performed by the CPU 1401 of the image forming apparatus 2 by reading and executing a corresponding program stored in the ROM 1403 or the disk 1404. In FIG. 12, S701 through S705 represent steps of this processing.

In step S701, the CPU 1401 of the image forming apparatus 2 is in the standby state until an email has been received. More specifically, it is determined whether an email, such as an email with an image file sent from the image forming apparatus 1, has been received by the image forming apparatus 2. If it is determined that an email has been received, the process proceeds to step S702.

In step S702, the CPU 1401 of the image forming apparatus 2 extracts the email address (in this case, the email address of the image forming apparatus 1) of the sender of the email received in step S701. The CPU 1401 of the image forming apparatus 2 then temporarily stores the extracted email address in the memory 1402 of the image forming apparatus 2.

In step S703, the CPU 1401 of the image forming apparatus 2 reads the reception record list registered in the disk 1404 of the image forming apparatus 2.

Then, in step S704, the CPU 1401 of the image forming apparatus 2 reads the email address stored in the memory 1402 and compares the email address with the reception record list read in step S703. That is, it is determined whether the received email address has been registered in the reception record list. If it is determined that the received email address has been registered in the reception record list, the processing is completed, and the process shifts to print processing, i.e., step S503 in FIG. 10.

On the other hand, if the CPU 1401 of the image forming apparatus 2 determines in step S704 that the email address received in step S701 has not been registered in the reception record list, the process proceeds to step S705.

In step S705, the CPU 1401 of the image forming apparatus 2 registers the email address received in step S701 in the reception record list. The process is then completed and shifts to the print processing, i.e., step S503 in FIG. 10.

The reception record list created as described above is displayed on the window screen 602 shown in FIG. 11 by the CPU 1401 of the image forming apparatus 2.

As described above, according to the second embodiment, in addition to the advantages achieved by the first embodiment, an address to which a print completion notification is not transmitted can be selected from the reception record list showing email addresses from which emails were received in the past. Such an address can be registered, for each email sender, as a print-completion-notification transmission inhibiting address. For example, if a situation where a print completion notification is printed in the image forming apparatus 1, which is the email sender, has occurred, the user selects the address of the image forming apparatus 1 from the reception record list by the use of the image forming apparatus 2 and registers the selected address as a print-completion-notification transmission inhibiting address. With this operation, the above-described situation of endless sending and receiving of print completion notifications never occurs.

As a result, the congestion of network traffic caused by wasteful transmission of print completion notifications can be solved, and also, printing of print completion notifications in an image forming apparatus, which is an email sender, can be prevented, which would otherwise wastefully consume printing resources, such as paper and recording agent.

Third Exemplary Embodiment

In a third embodiment of the present invention, an email sender instructs an email receiver that performs print processing not to return a print completion notification. Details of the third embodiment are as follows.

Details of the third embodiment are given below with reference to FIGS. 13 through 15 in the following context by way of example. Image data is read from a document and is formed into an image file by the image forming apparatus 1 and the image file is sent by email to the image forming apparatus 2, and the email is received by the image forming apparatus 2.

Figure 13:
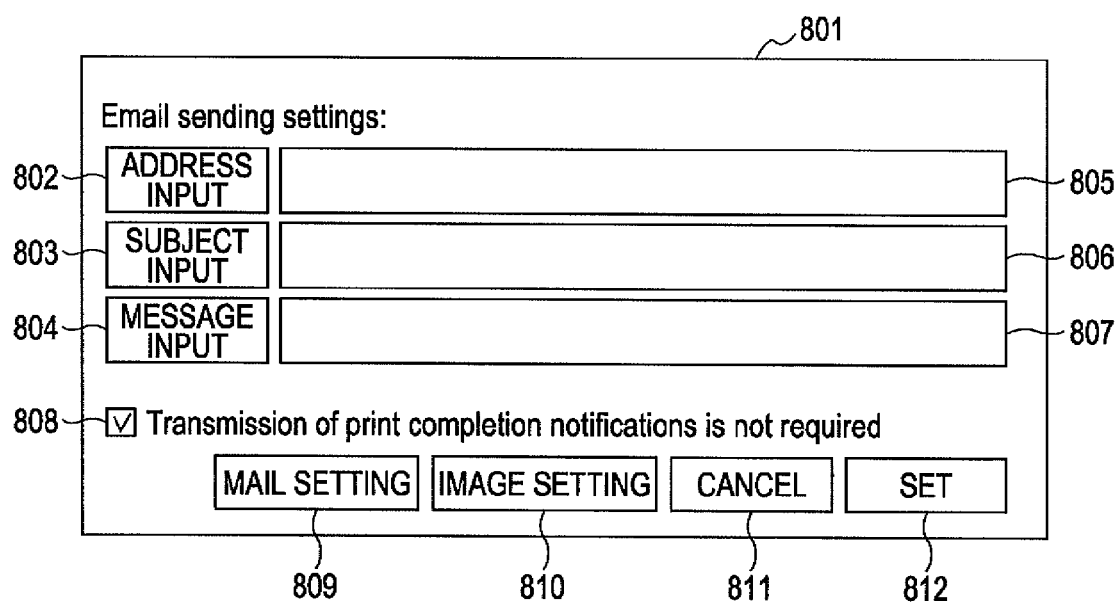
FIG. 13 is a schematic view illustrating an example of a user interface screen used for sending by email an image scanned by the image forming apparatus of an email sender in a third embodiment of the present invention.

FIG. 13 is a schematic view illustrating an example of a user interface screen used for sending an image scanned by an image forming apparatus, which is an email sender. A main screen 801 for making settings for sending an email is displayed on a user interface (liquid crystal panel 1406 of the operation unit 1305) provided for the image forming apparatus 1, i.e., the sender of a print command. When the user operates the operation unit 1305 of the image forming apparatus 1, the main screen 801 is displayed under the control of the CPU 1401 of the image forming apparatus 1.

The main screen 801 includes an address input button 802 for inputting an address, a field 805 in which an input address is displayed, a subject input button 803 for inputting a subject, a field 806 in which an input subject is displayed, a message input button 804 for inputting a message, and a field 807 in which an input message is displayed.

A user interface portion 808 is used for indicating that a reply email of a print completion notification is not required. A mail setting button 809 is used for setting details, such as a mail server and account information, required for sending an email. An image setting button 810 is used for setting details, such as the resolution and format of an image to be attached.

A cancel button 811 is used for canceling the content set on the email sending setting screen. A setting button 812 is used for setting information input on the email sending setting screen.

After setting a document on the document stand, the operator of the image forming apparatus 1 operates the keys of the operation unit 1305 to give an instruction to make settings for sending email. In response to this instruction, the CPU 1401 of the image forming apparatus 1 performs control so that the main screen 801 for making settings for sending email shown in FIG. 13 is displayed on the liquid crystal panel 1406 of the image forming apparatus 1, and various settings for sending email are received.

When the operator operates the address input button 802, the CPU 1401 of the image forming apparatus 1 performs control so that a user interface for inputting an address is displayed on the liquid crystal panel 1406. This user interface may be an address book that allows the operator to select an address from a list of email addresses or may be an interface that allows the operator to directly input an email address with a keyboard. The information concerning the address input by the operator is displayed in the field 805 under the control of the CPU 1401 of the image forming apparatus 1.

Then, when the operator operates the subject input button 803, the CPU 1401 of the image forming apparatus 1 performs control so that a user interface for inputting a subject is displayed on the liquid crystal panel 1406. This user interface is generally a virtual keyboard, and the operator operates the keyboard to input certain characters as the subject. Then, information concerning the subject input by the operator is displayed in the field 806 under the control of the CPU 1401 of the image forming apparatus 1.

Then, when the operator operates the message input button 804, the CPU 1401 of the image forming apparatus 1 performs control so that a user interface for inputting an email message is displayed on the liquid crystal panel 1406. This user interface is a virtual keyboard, and the operator operates the keyboard to input an email message. Information concerning the email message is displayed in the field 807 under the control of the CPU 1401 of the image forming apparatus 1.

The operator then operates the user interface portion 808 for indicating that the transmission of print completion notifications is not required. More specifically, if the user does not wish to receive print completion notifications, he/she can check the user interface portion 808 to indicate that the user does not wish to receive print completion notifications. This information is embedded in header information, for example, a field in which the subject is stored, used for sending email by the CPU 1401 of the image forming apparatus 1, and then, the image forming apparatus 2 can identify the information. The CPU 1401 of the image forming apparatus 1 embeds, for example, a character string "print completion notification=OFF" in the field in which the subject is stored.

Then, when the operator operates the setting button 812, the CPU 1401 of the image forming apparatus 1 performs control so that a document placed on the document stand is scanned with the scanner 1302 and is formed into an image file, and the image file is attached to an email and is sent to a destination address. In this case, if the user interface portion 808 is checked, the CPU 1401 of the image forming apparatus 1 embeds information indicating that the transmission of a print completion notification is not required (such information is hereinafter refers to as "print-completion-notification refusal information") in the header of the email.

The operator can also make detailed settings, such as a mail server and account information, required for sending an email, by operating the mail setting button 809, or the resolution and format of an image to be attached by operating the image setting button 810. This can be performed by a known operation, and an explanation thereof is thus omitted.

Figure 14:
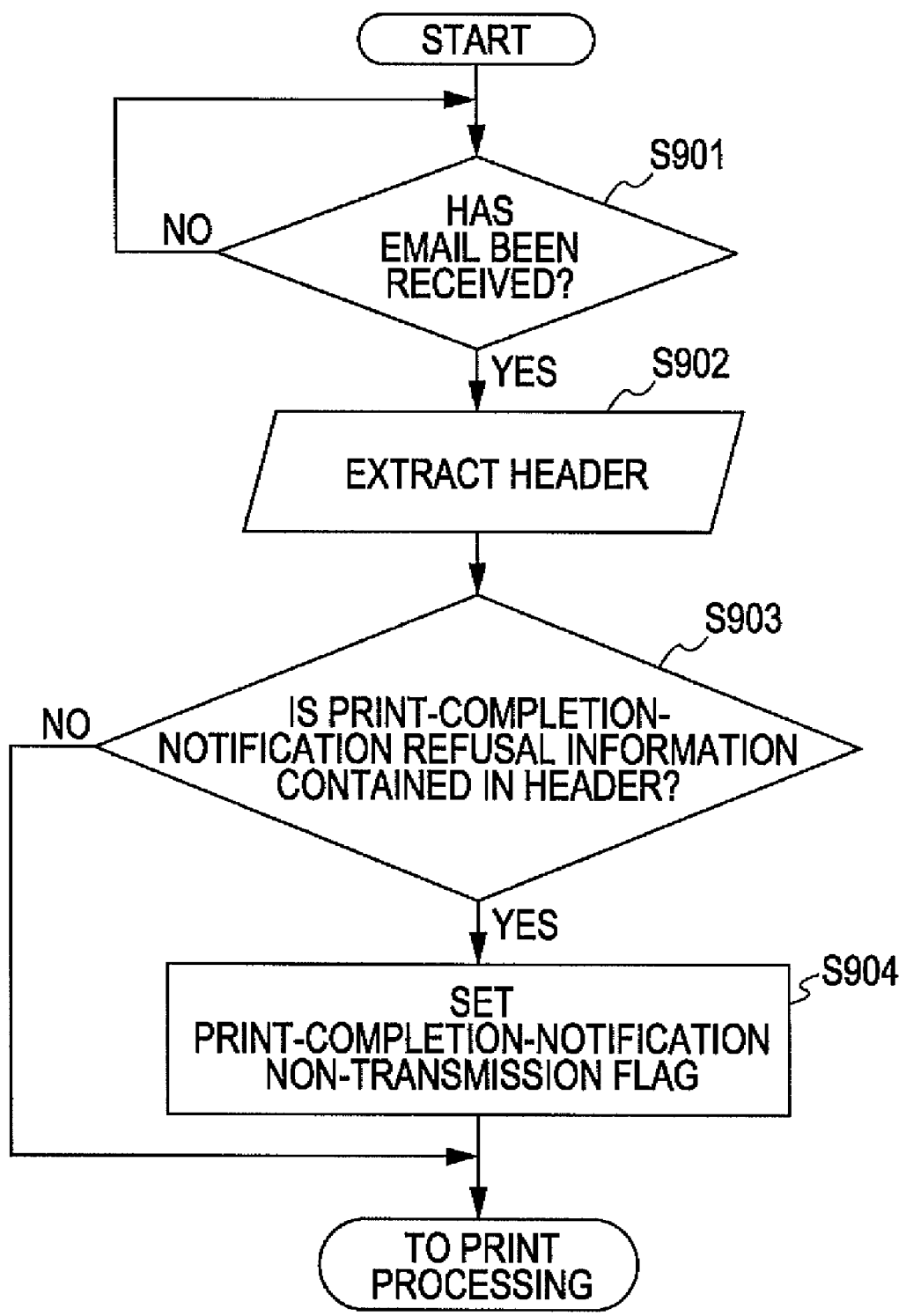
FIG. 14 is a flowchart illustrating an example of a third control process according to the third embodiment of the present invention.

A detailed description is now given, with reference to the flowchart in FIG. 14, of a practical application of print-completion-notification refusal information embedded in header information of an email to actual print processing performed by email.

FIG. 14 is a flowchart illustrating an example of a third control process according to the third embodiment of the present invention. The third control process corresponds to control processing for inhibiting the image forming apparatus 2 from transmitting print completion notifications by email. This processing can be performed by the CPU 1401 of the image forming apparatus 2 by reading and executing a corresponding program stored in the ROM 1403 or the disk 1404. In FIG. 14, steps S901 through S904 represent steps of this processing.

After placing a document on the document stand of the scanner 1302 of the image forming apparatus 1, the operator operates the setting button 812 shown in FIG. 13 to give an instruction to start sending an email. Then, the CPU 1401 of the image forming apparatus 1 performs control so that the document placed on the document stand is scanned with the scanner 1302 and the scanned image data is formed into an image file and is attached to an email, and is sent to a destination address. In this case, if the user interface portion 808 shown in FIG. 13 is checked, the CPU 1401 of the image forming apparatus 1 embeds print-completion-notification refusal information into the email header.

Referring to FIG. 14, in step S901, the CPU 1401 of the image forming apparatus 2 is in the standby state until an email has been received. More specifically, it is determined in step S901 whether an email (e.g., an email with an image file sent from the image forming apparatus 1) has been received by the image forming apparatus 2, and if an email has been received, the process proceeds to step S902.

In step S902, the CPU 1401 of the image forming apparatus 2 extracts the header from the email received in step S901. In step S903, the CPU 1401 of the image forming apparatus 2 determines whether print-completion-notification refusal information, e.g., "print completion notification=OFF" indicated in the subject field, is contained in the header extracted in step S902.

Figure 15:
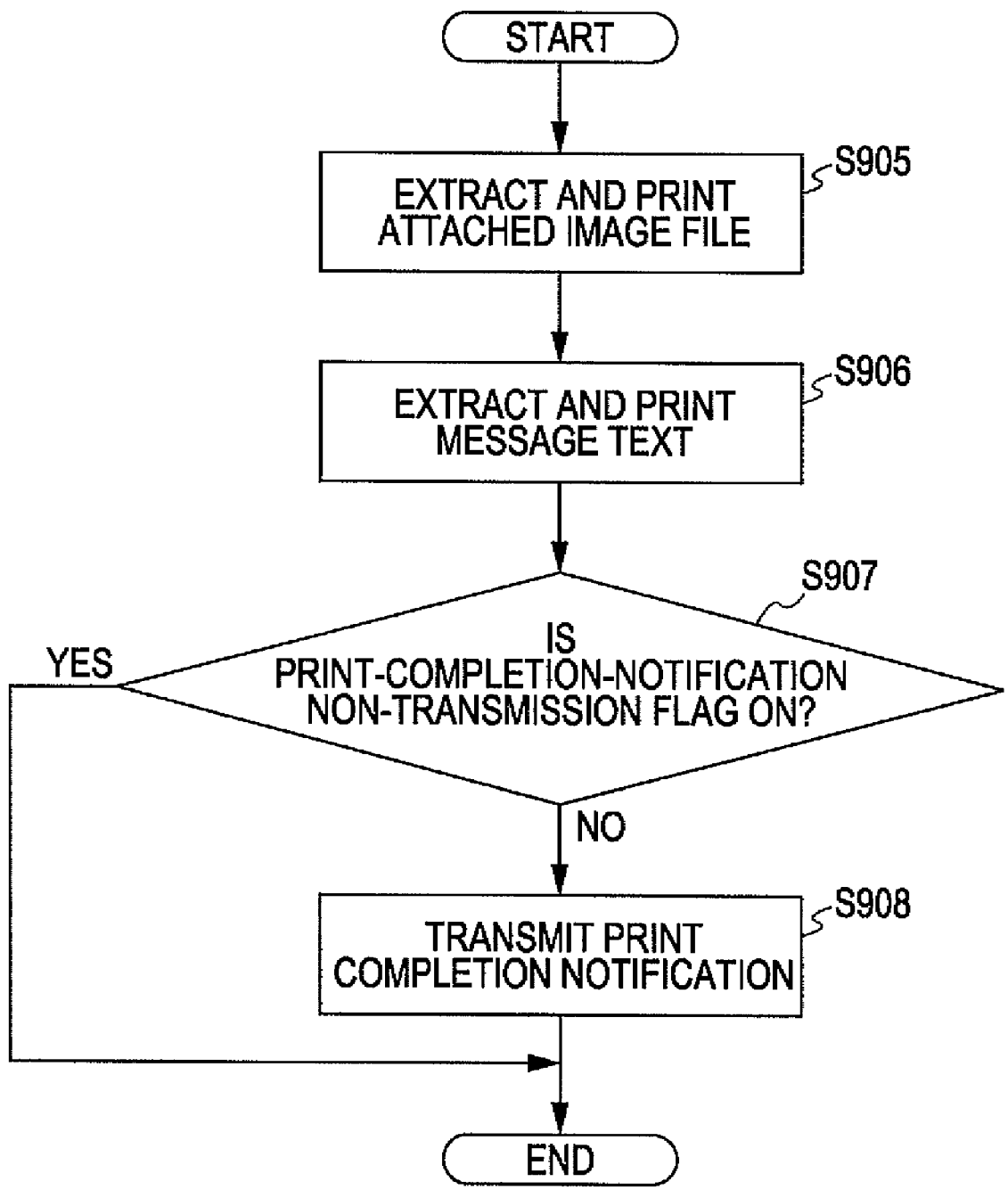
FIG. 15 is a flowchart illustrating an example of a fourth control process according to the third embodiment of the present invention.

If it is determined in step S903 that the above-described information is not contained in the extracted header, the process shifts to the print processing (S905 in FIG. 15). In contrast, if print-completion-notification refusal information is contained in the extracted header, the process proceeds to step S904.

In step S904, the CPU 1401 of the image forming apparatus 2 turns ON a flag indicating that the transmission of print completion notifications is inhibited (such a flag is hereinafter referred to as the "print-completion-notification non-transmission flag"), and proceeds to the print processing (step S905 in FIG. 15). It should be assumed that the print-completion-notification non-transmission flag is set in the OFF state before starting this processing.

FIG. 15 is a flowchart illustrating an example of a fourth control process according to the third embodiment of the present invention. The fourth control process corresponds to print processing performed by the image forming apparatus 2. This processing can be performed by the CPU 1401 of the image forming apparatus 2 by reading and executing a corresponding program stored in the ROM 1403 or the disk 1404 of the image forming apparatus 2. In FIG. 15, S905 through S908 represent steps of this processing.

In step S905, the CPU 1401 of the image forming apparatus 2 extracts the image file attached to the email received in step S901 in FIG. 14. After generating image data from the extracted image file, the CPU 1401 of the image forming apparatus 2 converts the image data into a raster image, which is suitable for print processing, and executes print processing.

Then, in step S906, the CPU 1401 of the image forming apparatus 2 extracts the message of the email received in step S901 in FIG. 14. If text data is included in the extracted message, the CPU 1401 of the image forming apparatus 2 also converts the text data into a raster image, which is suitable for print processing, and executes print processing.

Upon completing the print processing, the CPU 1401 of the image forming apparatus 2 determines in step S907 whether the print-completion-notification non-transmission flag, which is set in step S904 in FIG. 14, is ON. If it is determined in step S907 that the print-completion-notification non-transmission flag is ON, the processing is completed without transmitting a print completion notification.

On the other hand, if it is determined in step S907 that the print-completion-notification non-transmission flag is not ON, the process proceeds to step S908. In step S908, the CPU 1401 of the image forming apparatus 2 performs control so that a print completion notification is transmitted by email to the sender of the email received in step S901 (in this case, the image forming apparatus 1). The processing is then completed.

As described above, by embedding print-completion-notification refusal information in, for example, an email header, and by sending such information by email from a sender, it is possible for the email sender to refuse the reception of a print completion notification. Accordingly, if users do not wish to receive print completion notifications, they can control an image forming apparatus (receiver) not to transmit a print completion notification. As a result, the congestion of network traffic caused by wasteful transmission of print completion notifications can be solved, and also, printing of print completion notifications in an image forming apparatus that has sent a print command can be prevented, which would otherwise wastefully consume printing resources, such as paper and recording agent.

The area in which print-completion-notification refusal information is embedded does not have to be an email header, and may be an email message itself.

In the third embodiment, when the setting button 812 is operated in the state in which the user interface portion 808 shown in FIG. 13 is checked, the CPU 1401 of the image forming apparatus 1 embeds print-completion-notification refusal information in an email header.

Information indicating that the transmission of print completion notifications is not required may be indicated in another manner. For example, the operator may manually input a predetermined character string (e.g., "print completion notification=OFF") in an email subject and sends email.

That is, the operator of the image forming apparatus 1 operates the subject input button 803 to display a virtual keyboard. The operator then inputs "print completion notification=OFF" into the head of the subject and gives an instruction to send an email. The CPU 1401 of the image forming apparatus 1 then embeds subject information input by the operator in the subject information field of the header information so that the image forming apparatus 2, which is the receiver, can identify the subject information.

Fourth Exemplary Embodiment

In a fourth embodiment of the present invention, an email sender performs control so that printing of a print completion notification received from an email receiver can be prevented.

Details of the fourth embodiment are discussed below with reference to FIGS. 16 and 17 in the following context. Image data is read from a document and is formed into an image file by the image forming apparatus 1, and the image file is sent to the image forming apparatus 2 by email, and the email is received by the image forming apparatus 2.

Figure 16:
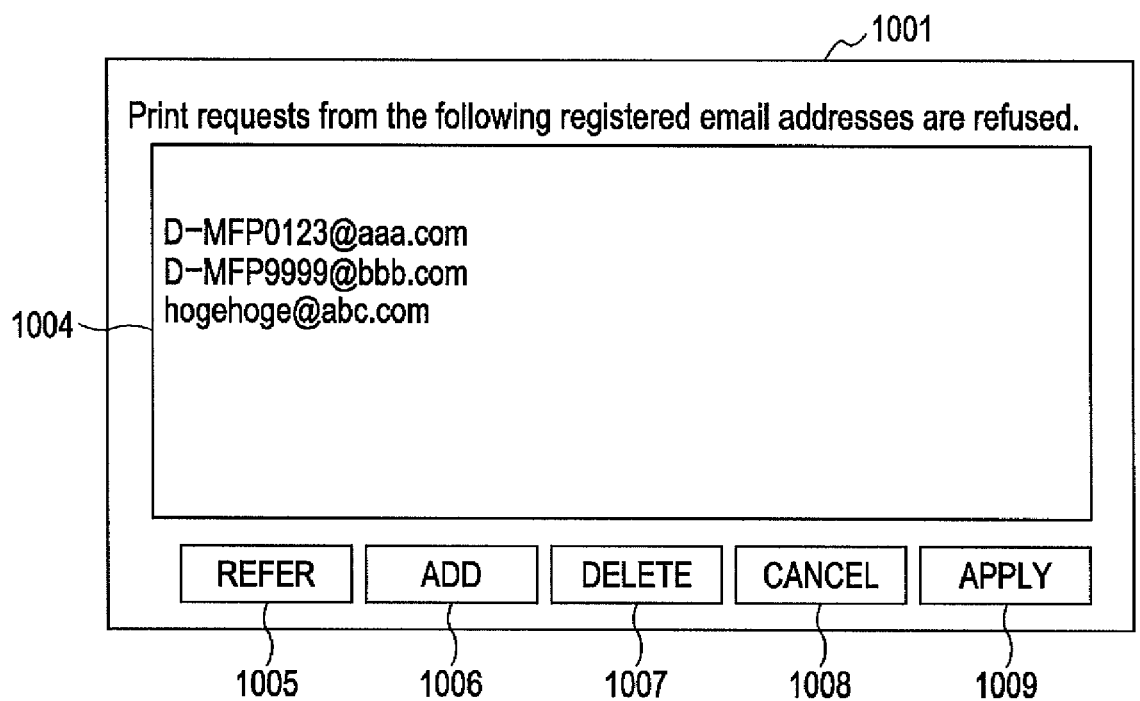
FIG. 16 is a schematic view illustrating an example of a user interface displayed on the liquid crystal panel of the image forming apparatus of an email sender in a fourth embodiment of the present invention, the user interface being used for registering addresses received from which print requests are refused.

FIG. 16 is a schematic view illustrating an example of a user interface screen for registering addresses from which print requests are refused. The user interface screen is displayed on the liquid crystal panel 1406 of an image forming apparatus, which is an email sender.

In FIG. 16, a user interface screen 1001 for refusing email print requests is displayed on a user interface provided for the image forming apparatus 1 (i.e., the email sender of a print command). When the user operates the operation unit 1305 of the image forming apparatus 1, the content of the operation performed on the user interface screen 1001 is reflected under the control of the CPU 1401.

The user interface screen 1001 includes a field 1004 in which a list of email addresses from which email print requests are refused (hereinafter such addresses are referred to as "email-print-request refusal addresses") is displayed. A refer button 1005 is used for displaying an address list that can be viewed from the image forming apparatus 1.

An add button 1006 is used for registering new email-print-request refusal addresses. A delete button 1007 is used for deleting registered email-print-request refusal addresses. A cancel button 1008 is used for canceling the content set on the user interface screen 1001. An apply button 1009 is used for applying the content set on the user interface screen 1001.

The operator can refer to email addresses that can be viewed from the image forming apparatus 1 by operating the refer button 1005. When the operator operates the refer button 1005, the CPU 1401 of the image forming apparatus 1 performs control so that an address book screen (not shown), such as that shown in FIG. 7, is displayed on the liquid crystal panel 1406 of the image forming apparatus 1. The operator selects email-print-request refusal addresses from the address list on the address book screen. Then, the CPU 1401 of the image forming apparatus 1 performs control so that the email-print-request refusal addresses selected on the address book screen are added in the window 1004.

Alternatively, the operator can directly specify email-print-request refusal addresses by operating the add button 1006. When the add button 1006 is operated, the CPU 1401 of the image forming apparatus 1 performs control so that an address input screen (not shown), such as that shown in FIG. 8, is displayed on the liquid crystal panel 1406 of the image forming apparatus 1. When the operator inputs an email-print-request refusal address on the address input screen, the CPU 1401 of the image forming apparatus 1 performs control so that the input address is added in the window 1004.

The operator can delete email-print-request refusal addresses by operating the delete button 1007. When the operator operates the delete button 1007, the CPU 1401 of the image forming apparatus 1 performs control so that an address delete screen (not shown), such as that shown in FIG. 9, is displayed on the liquid crystal panel 1406 of the image forming apparatus 1. The operator selects an email-print-request refusal address from the address list displayed on the address delete screen. Then, the CPU 1401 of the image forming apparatus 1 performs control such that the addresses selected on the address delete screen are deleted from the window 1004.

The operator can also cancel the content set on the user interface screen 1001 by operating the cancel button 1008. When the cancel button 1008 is operated, the CPU 1401 of the image forming apparatus 1 performs control so that the content set on the user interface screen 1001 is canceled.

The operator can also apply the content set on the user interface screen 1001 by operating the apply button 1009. When the apply button 1009 is operated, the CPU 1401 of the image forming apparatus 1 performs control so that the settings of email-print-request refusal addresses input on the user interface screen 101 are registered (stored) in the disk 1404 as email-print-request refusal setting information.

Figure 17:
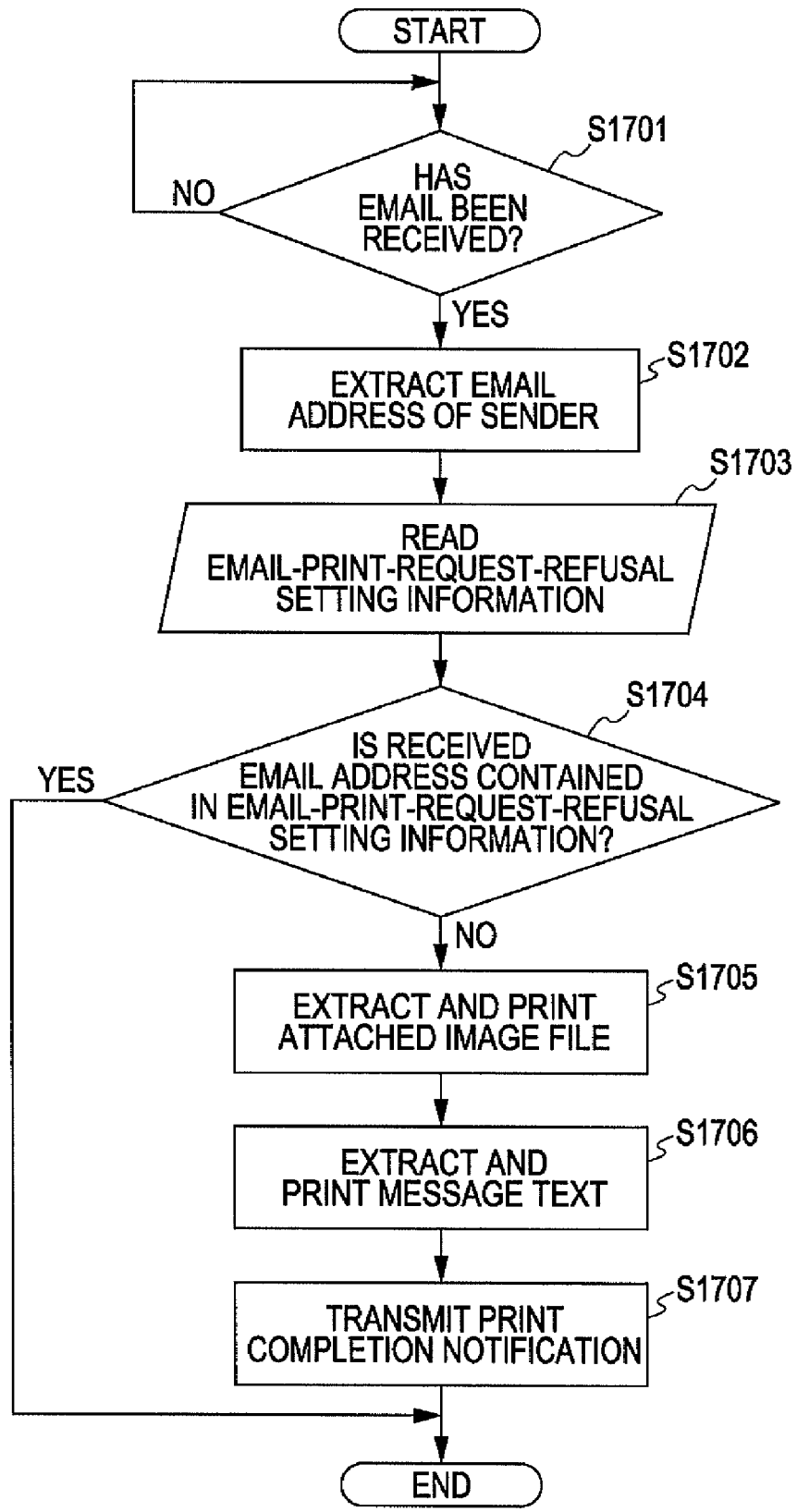
FIG. 17 is a flowchart illustrating an example of a fifth control process according to the fourth embodiment of the present invention.

A description is now given, with reference to the flowchart in FIG. 17, of a practical application of email-print-request refusal setting information registered as described above.

FIG. 17 is a flowchart illustrating an example of a fifth control process according to the fourth embodiment of the present invention. The fifth control process corresponds to email-print-request refusal control processing performed by the image forming apparatus 1. This processing can be performed by the CPU 1401 of the image forming apparatus 1 by reading and executing a corresponding program stored in the ROM 1403 or the disk 1404. In FIG. 17, steps S1701 through S1707 represent steps of this processing.

After placing a document on the document stand of the image forming apparatus 1, the operator gives an instruction to start sending an email. Then, the CPU 1401 of the image forming apparatus 1 performs control so that the document placed on the document stand is scanned with the scanner 1302 and is formed into an image file, and the image file is then attached to an email and is sent to a destination address. The image forming apparatus 2 receives the email and performs print processing with the printer 1303, and then returns a print completion notification by email to the image forming apparatus 1, which is the email sender.

Now referring to FIG. 17, in step S1701, the CPU 1401 of the image forming apparatus 1 is in the standby state until an email has been received. If it is determined in step S1701 that an email (such as a print completion notification sent from the image forming apparatus 2) has been received, the process proceeds to step S1702.

In step S1702, the CPU 1401 of the image forming apparatus 1 extracts the sender address of the email (email address of the image forming apparatus 2) received in step S1701. Then, the CPU 1401 of the image forming apparatus 1 temporarily stores the extracted email address in the memory 1402 of the image forming apparatus 1.

In step S1703, the CPU 1401 of the image forming apparatus 1 reads the email-print-request refusal setting information registered in the disk 1404 of the image forming apparatus 1.

Then, in step S1704, the CPU 1401 of the image forming apparatus 1 reads the sender address stored in the memory 1402 and determines whether the sender address is contained in the email-print-request refusal setting information read in step S1703. If it is determined in step S1704 that the sender address is contained in the email-print-request refusal setting information, the CPU 1401 of the image forming apparatus 1 determines that the email print request (printing of email) is refused. Accordingly, the email print request is ignored without printing the email, and the process is completed. It should be noted, however, that the log of the received email (information concerning the sender and the email reception date) is stored in the memory 1402.

If it is determined in step S1704 that the email address received in step S1701 is not contained in the email-print-request refusal setting information, the CPU 1401 of the image forming apparatus 1 determines that the email-print-request is not refused, and the process proceeds to step S1705.

Then, in step S1705, the CPU 1401 of the image forming apparatus 1 extracts the image file attached to the email received in step S1701. After generating image data from the extracted image file, the CPU 1401 of the image forming apparatus 1 converts the image data into a raster image, which is suitable for print processing, and performs print processing.

Then, in step S1706, the CPU 1401 of the image forming apparatus 1 extracts the message of the email received in step S1701. If text data is included in the extracted message, the CPU 1401 of the image forming apparatus 1 also converts the text data into a raster image, which is suitable for print processing, and then performs print processing.

Upon completing the print processing, in step S1707, the CPU 1401 of the image forming apparatus 1 performs control so that a print completion notification is transmitted by email to the email sender (in this case, the image forming apparatus 2). The processing is then completed.

As described above, it is possible that an email sender that instructs print processing can refuse printing of a print completion notification. Accordingly, emails only from users who require printing of emails can be printed out. That is, an email received from a specific sender can be assumed to be a print completion notification, and printing of the print completion notification from the specific sender can be prevented. As a result, printing of print completion notifications can be prevented in an image forming apparatus, which is an email sender, which would otherwise wastefully consume printing resources, such as paper and recording agent. However, the log of received emails is stored, which makes it possible for a receiver to ascertain that a print completion notification has been received.

In the fourth embodiment, if it is determined in step S1704 in FIG. 17 that the received email address is contained in the email-print-request refusal setting information, the email print request is ignored, and received email is not printed. However, if it is determined in step S1704 that the received email address is contained in the email-print-request refusal setting information, steps S1705 and S1706 (printing) may be executed, and only step S1707 (sending of a print completion notification) is not executed.

Fifth Exemplary Embodiment

In a fifth embodiment of the present invention, the printing of a reply email returned from a receiver in response to a print command which has been sent from a sender by using an email sending function can be suspended for a predetermined time.

Details of the fifth embodiment are described below, with reference to FIGS. 18 and 19, in the following context. Image data is read from a document and formed into an image file by the image forming apparatus 1, and the image file is sent to the image forming apparatus 2. Then, the image file is received by the image forming apparatus 2.

Figure 18:
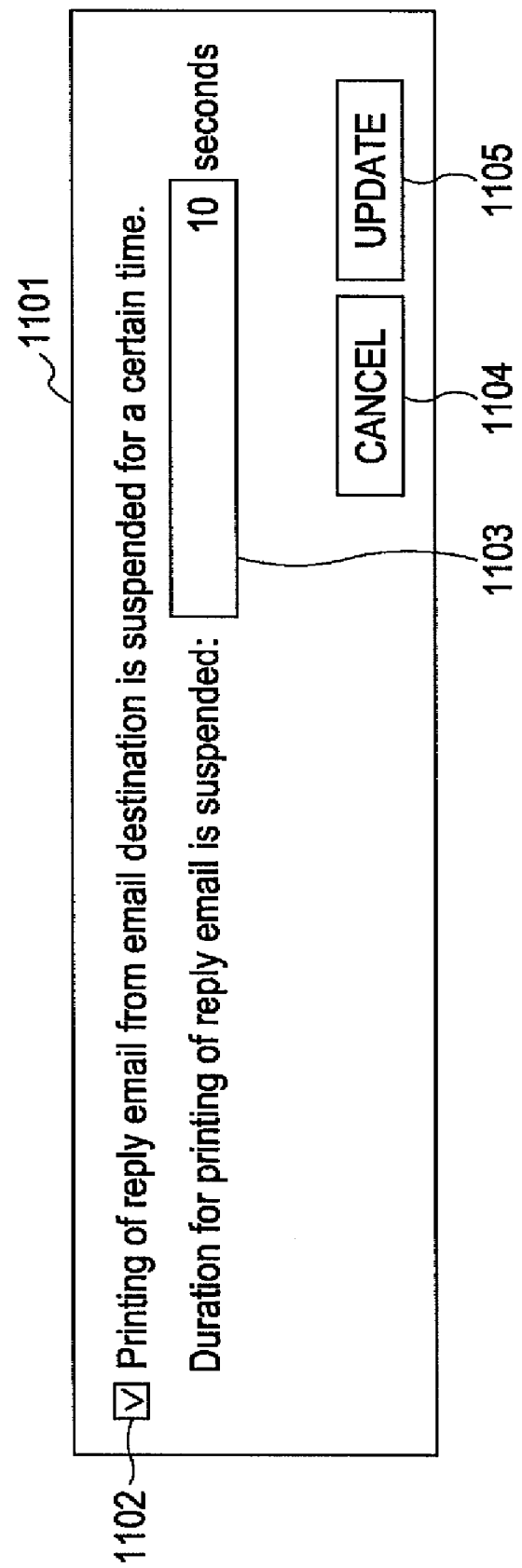
FIG. 18 is a schematic view illustrating an example of a user interface screen displayed on the liquid crystal panel of the image forming apparatus of an email sender in a fifth embodiment of the present invention, the user interface screen being used for setting a time for which the printing of reply emails from an email destination is suspended.

FIG. 18 is a schematic view illustrating an example of a user interface screen for setting a time for which the printing of a reply email from an email receiver is suspended. The user interface screen is displayed on the liquid crystal panel 1406 of an image forming apparatus, which is an email sender.

In FIG. 18, a user interface screen 1101 for setting a time for which the printing of a reply email from an email receiver is suspended is displayed on a user interface (liquid crystal panel 1406 of the operation unit 1305) provided for the image forming apparatus 1 (i.e., the sender of an email print command). When the user operates the operation unit 1305 of the image forming apparatus 1, the user interface screen 1101 is displayed under the control of the CPU 1401 of the image forming apparatus 1.

The user interface screen 1101 includes a user interface portion 1102 for making the function of suspending reply email effective and a user interface portion 1103 for setting a time for which the printing of a reply email is suspended.

A cancel button 1104 is used for canceling the content set on the user interface screen 1101. An update button 1105 is used for updating the content set on the user interface screen 1101.

The operator checks the user interface portion 1102 and inputs a numerical value into the user interface portion 1103, and then operates the update button 1105. The CPU 1401 of the image forming apparatus 1 then performs control so that the user interface screen 1101 is closed and the content set on the user interface screen 1101 is registered (stored) in the disk 1404 as reply-email suspension setting information. Thereafter, the CPU 1401 of the image forming apparatus 1 performs control in accordance with the reply-email suspension setting information so that the printing of a reply email from an email receiver is suspended.

This can be represented by the following example. If an email is sent from the image forming apparatus 1 to the image forming apparatus 2, the printing of an email returned from the image forming apparatus 2 to the image forming apparatus 1 is suspended until a certain time elapses.

The reply-email suspension control processing performed by the image forming apparatus 1 is described below with reference to the flowchart in FIG. 19.

Figure 19:
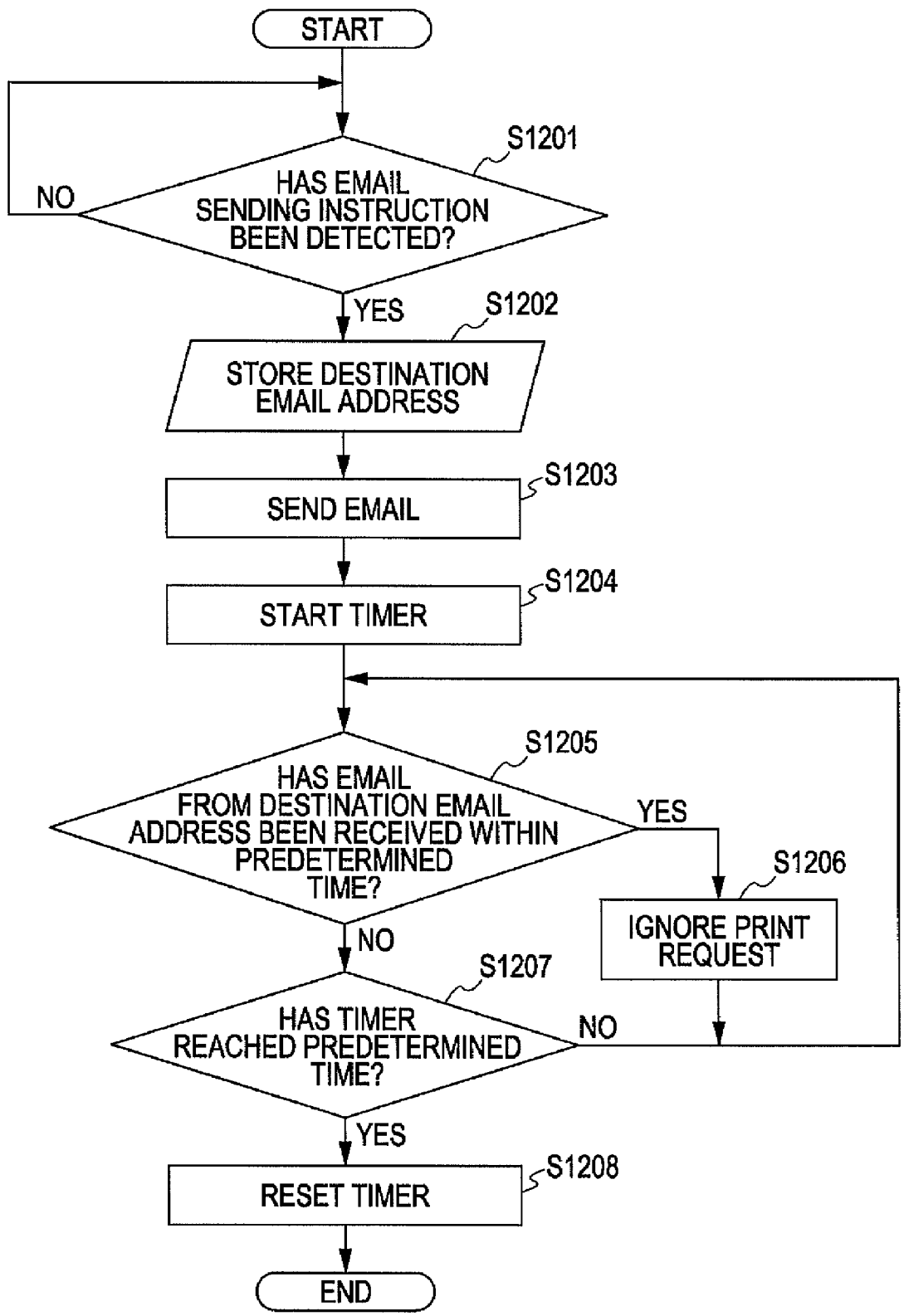
FIG. 19 is a flowchart illustrating an example of a sixth control process according to the fifth embodiment of the present invention.
Figure 21:
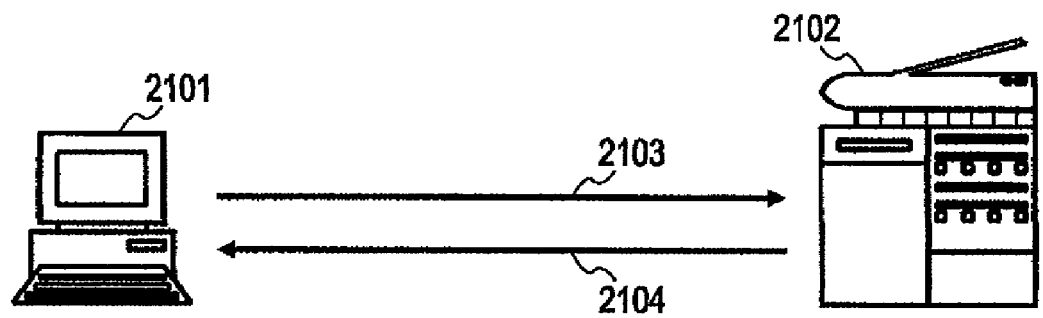
FIG. 21 illustrates a known system for sending and receiving a print command and a print completion notification by email.
Figure 22:
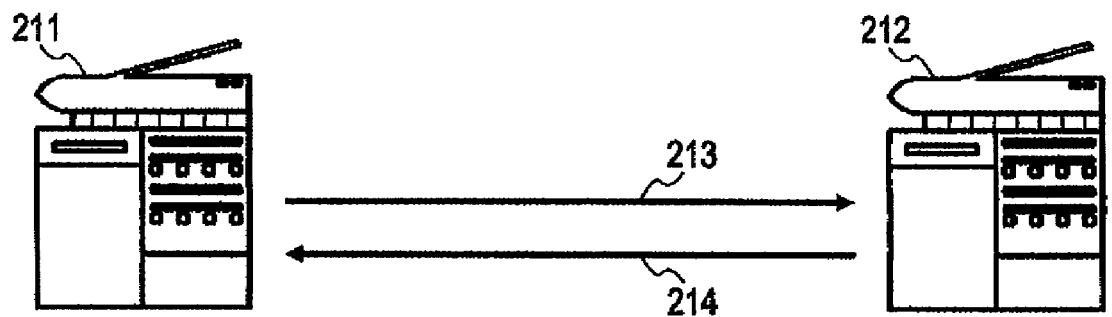
FIG. 22 illustrates a known image forming system for sending and receiving a print command and a print completion notification by email.

FIG. 19 is a flowchart illustrating an example of a sixth control process. The sixth control process corresponds to reply-email suspension control processing performed by the image forming apparatus 1 of the fifth embodiment. This processing can be performed by the CPU 1401 of the image forming apparatus 1 by reading and executing a corresponding program stored in the ROM 1403 or the disk 1404 of the image forming apparatus 1. In FIG. 19, steps S1201 through S1208 represent steps of this processing.

If the reply-email suspension setting information indicates that the printing of a reply email from an email receiver is suspended for a predetermined time (i.e., the user interface portion 1102 is checked), the CPU 1401 of the image forming apparatus 1 performs the processing indicated by the flowchart in FIG. 19.

In step S1201, the CPU 1401 of the image forming apparatus 1 is in the standby state until an email sending instruction has been detected. If it is determined in step S1202 that an email sending instruction has been detected, the process proceeds to step S1201.

In step S1202, the CPU 1401 of the image forming apparatus 1 extracts the destination address (in this case, the email address of the image forming apparatus 2) of the email sending instruction detected in step S1201. Then, the CPU 1401 of the image forming apparatus 1 temporarily stores the extracted email address in the memory 1402 of the image forming apparatus 1.

Then, in step S1203, the CPU 1401 of the image forming apparatus 1 sends an email on the basis of the email sending instruction detected in step S1201. The process then proceeds to step S1204 in which a timer starts counting the time.

It is then determined in step S1205 whether an email has been received from the destination address (address of the image forming apparatus 2) extracted in step S1202 before the timer has reached the time indicated in the reply-email suspension setting information.

If it is determined in step S1205 that an email has been received before the timer has reached the above-described time, the process proceeds to step S1206.

In step S1206, the CPU 1401 of the image forming apparatus 1 ignores a print command (email print request) received from the destination address (address of the image forming apparatus 2) by email. This can inhibit the printing of the email sent from the image forming apparatus 2. The process then returns to step S1205 in which the CPU 1401 of the image forming apparatus 1 continues monitoring the reception of an email print request from the destination address.

If it is determined in step S1205 that an email print request has not been received from the destination address before the timer reaches the time indicated in the reply-email suspension setting information, the process proceeds to step S1207.

In step S1207, the CPU 1401 of the image forming apparatus 1 determines whether the timer has reached the predetermined time indicated in the reply-email suspension setting information. If it is determined in step S1207 that the timer has not reached the predetermined time, the process returns to step S1205 in which the CPU 1401 of the image forming apparatus 1 continues monitoring the reception of an email print request from the destination address.

In contrast, if it is determined in step S1207 that the timer has reached the predetermined time, the process proceeds to step S1208. In step S1208, the timer is reset, and the processing is completed. An email sent from the image forming apparatus 1 after step S1208 is printed out without being suspended.

Although it is not shown, if an email has been received from an address other than the destination address before the timer has reached the predetermined time in step S1207, the CPU 1401 of the image forming apparatus 1 executes a print command sent through this email.

As described above, an email sender that instructs print processing can perform control so that the printing of a reply email returned from an email destination is suspended for a predetermined time. This makes it possible to effectively prevent the printing of print completion notifications sent from an image forming apparatus that has performed print processing. As a result, printing of print completion notifications can be prevented in an image forming apparatus, which is an email sender, which would otherwise wastefully consume printing resources, such as paper and recording agent.

In the fifth embodiment, if an email is received from an email destination within a predetermined time after an email has been sent, printing of the received email can be prevented. This may be modified as follows. If an email is received from the email destination within the predetermined time, printing of the received email may be performed, and only a print completion notification is not transmitted.

In the foregoing embodiments, assuming that emails received in various manners are print completion notifications, printing of the print completion notifications is inhibited, or even if the print completion notifications are printed out, print completion notifications are not transmitted.

Alternatively, the fact that a received email is a print completion notification may be directly identified, and then, control may be performed so that printing is inhibited, or if printing is performed, a print completion notification is not sent.

For example, if a character string to represent a print completion notification is indicated in the subject of the email header, it can be determined that the received email is concerned with a print completion notification.

In the flowchart in FIG. 14, for example, after the image forming apparatus 2 has received an email, instead of determining in step S903 whether print-completion-notification refusal information is contained in the header, it is determined whether information indicating a print completion notification is contained. If such information is contained in the message instead of the subject of the header, information other than the header is also extracted in step S902.

If it is determined in step S903 that information indicating a print completion notification is contained, a print-completion-notification non-transmission flag is set in step S904. With this modification, even if an email indicating a print completion notification is printed, a print completion notification indicating that printing of this email is completed is not transmitted. Accordingly, wasteful communication of print completion notifications can be reduced, and the load of the network traffic can be decreased.

The printing of an email indicating a print completion notification can also be inhibited in a manner similar to that described above.

More specifically, in the flowchart in FIG. 14, when the image forming apparatus 2 has received an email, for example, instead of determining in step S903 whether print-completion-notification refusal information is contained in the header, it is determined whether information indicating a print completion notification is contained.

If such information is contained, in step S904, instead of setting the print-completion-notification non-transmission flag, a flag inhibiting the printing of the email indicating the print completion notification is set. This can prevent the printing of the received email indicating the print completion notification, and as a result, an email indicating a print completion notification is not sent. Thus, wasteful communication of print completion notifications can be reduced.

In this case, a log of the reception of print completion notifications is stored, which makes it possible for a sender to ascertain that email sent from the sender has successfully been printed by a receiver.

As describe above, one or both of the problems of wasteful communication of print completion notifications, i.e., the congestion of the network traffic, and wasteful consumption of printing resources, such as printing media and recording agent, can be solved.

In the foregoing discussion, after a print command sender receives an email indicating a print completion notification from a receiver, transmission of another print completion notification indicating that the received email has been printed is inhibited, or the printing itself of the received email is inhibited. However, instead of print completion notifications, print abnormality termination notifications or print rejection notifications may be used and processed in a manner similar to that described above. Email protocols or email format other than those described above may be used. As the transmission medium, a source other than email may be used.

The configurations and contents of the user interfaces are not restricted to those discussed in the foregoing embodiments, other configurations and contents may be employed according to the purpose of use.

The present invention has been discussed in the context of an image forming apparatus by way of example. However, the present invention may be used in various forms, such as a system, an apparatus, a method, a program, and a recording medium. More specifically, the present invention may be applied to a system including a plurality of devices or an apparatus including a single device.

The configuration of a memory map of a storage medium (recording medium) that stores various data processing programs readable by the image forming apparatus 1 or 2 is described below with reference to the memory map shown in FIG. 20.

In addition to the data processing programs shown in FIG. 20, information for managing the data processing programs stored in the storage medium, e.g., version information and creator, and information dependent on the operating system (OS) of a program reader, e.g., icons for displaying the programs such that the programs can be distinguished from each other, may be stored, though such information is not shown.

Data dependent on the data processing programs is also managed by the directory of the program map. An installation program for installing the data processing programs into a computer or a decompression program for decompressing compressed data processing programs to be installed may also be stored.

The functions indicated by the flowcharts in FIGS. 10, 12, 14, 15, 17, and 19 may be executed by a host computer by the use of programs installed from an external source. In this case, the present invention is also applicable to a case where a set of information items including the programs is supplied to an output device through a storage medium, such as a compact disc read only memory (CD-ROM), a flash memory, or a floppy disk (FD), or an external storage medium via a network.

As described above, by supplying a storage medium that stores software program codes implementing the functions of the above-described embodiments to a system or an apparatus and by reading and executing the program codes stored in the storage medium by a computer (or a CPU or a microprocessor unit (MPU)) of the system or the apparatus, the present invention can be implemented.

The form of programs, such as object codes, programs executed by interpreters, script data supplied to an OS, is not restricted, as long as program functions are provided.

Storage media for supplying the programs include FDs, hard disks, optical discs, magneto-optical disks, MOs, CD-ROMs, CD-recordable (CD-Rs), CD-rewritable (CD-RWs), magnetic tape, non-volatile memory cards, ROMs, digital versatile discs (DVDs), etc.

In this case, program codes themselves read from the storage medium implement the functions of the foregoing embodiments, and the storage medium storing such program codes can constitute the present invention.

The programs may be supplied in various other manners. For example, an Internet homepage may be accessed by using the browser of a client computer and the programs may be downloaded from the homepage to a storage medium, such as a hard disk. Alternatively, a compressed file including an automatic installation function may downloaded from the homepage to a storage medium, such as a hard disk. Alternatively, the program codes forming the programs may be divided into a plurality of program files, and the files may be downloaded from different homepages. That is, a world wide web (WWW) server or a file transfer protocol (FTP) server that allows a plurality of users to download the program files for implementing the functions by the use of a computer can constitute the present invention.

The programs may be encrypted and stored in a storage medium, such as a CD-ROM, and may be distributed to users. Then, only users that satisfy predetermined conditions are allowed to download key information for decrypting the programs. Then, the programs may be decrypted with the key information and are then executed and installed into the computer.

As stated above, by executing the program codes read by the computer, the above-described functions of the embodiments can be implemented. Additionally, an OS, for example, running on the computer may execute the entirety or part of the processing on the basis of instructions of the program codes so that the functions of the foregoing embodiments can be implemented. Such a modification also constitutes the present invention.

The program codes read from a storage medium may be written into a function expansion board inserted into a computer or a memory provided for a function expansion unit connected to the computer. Then, on the basis of the instructions of the program codes, the CPU, for example, of the function expansion board or the function expansion unit may execute the entirety or part of the processing so that the functions of the foregoing embodiments can be implemented. Such a modification also constitutes the present invention.

The present invention may be applied to a system including a plurality of devices or an apparatus including a single device. The functions of the foregoing embodiments may be implemented by supplying programs to the system or the apparatus. In this case, by reading out a storage medium storing software programs used for implementing the present invention to the system or the apparatus, the system or the apparatus can achieve the advantages of the present invention.

The present invention is not restricted to the above-described embodiments, and various modifications (including organic combinations of the embodiments) are possible on the basis of the concept of the invention, and should not be excluded from the scope of the invention.

The present invention has been discussed through illustration of various embodiments and examples, and the concept and scope of the invention are not restricted to such embodiments and examples.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-267307 filed Sep. 29, 2006, which is hereby incorporated by reference herein in its entirety.

What is claimed is:

1. A data communication apparatus comprising:
   a receiver adapted to receive electronic mail data from other data communication apparatus;
   a printer adapted to print an image based on the electronic mail data received by the receiver;
   a notification unit adapted to transmit, as electronic mail data, a print completion notification indicating a completion of a printing of the image by said printer, to the other data communication apparatus;
   a determination unit adapted to determine whether or not the received electronic mail data includes print completion notification information, wherein the print completion notification information indicates a completion of a printing which is executed at the other data communication apparatus; and
   a control unit adapted to control the notification unit to transmit the print completion notification to the other data communication apparatus in a case where the determination unit determines that the received electronic mail data does not include the print completion notification information, and to prevent the notification unit from transmitting the print completion notification to the other data communication apparatus in a case where said determination unit determines that the received electronic mail data includes the print completion notification information,
   wherein the control unit performs control to store the received electronic mail data in a storage unit in a case where the determination unit determines that the received electronic mail data includes the print completion notification information.

2. The data communication apparatus according to claim 1, wherein the control unit controls said printer to convert text data which is included in the print completion notification received by the receiver by the receiver into an image and to print the image.

3. A system including a first data communication apparatus and a second communication apparatus, comprising:
   the first data communication apparatus comprising:
      a receiver adapted to receive electronic mail data from other data communication apparatus;
      a first printer adapted to print an image based on the electronic mail data received by the receiver;
      a first notification unit adapted to transmit, as electronic mail data, a print completion notification indicating a completion of a printing of the image by the first printer;
      a determination unit adapted to determine whether or not the received electronic mail data includes print completion notification information, wherein the print completion notification information indicates a completion of a printing which is executed at the other data communication apparatus; and
      a control unit adapted to control the first notification unit to transmit the print completion notification to the other data communication apparatus in a case where the determination unit determines that the received electronic mail data does not include the print completion notification information, and to prevent the first notification unit from transmitting the print completion notification to the other data communication apparatus in a case where the determination unit determines that the received electronic mail data includes the print completion notification information,
      wherein the control unit performs control to store the received electronic mail data in a storage unit in a case where the determination unit determines that the received electronic mail data includes the print completion notification information; and
   the second data communication apparatus comprising:
      a second printer adapted to print an image based on electronic mail data transmitted from the first data communication apparatus; and
      a second notification unit adapted to transmit, as electronic mail data, a print completion notification indicating a completion of a printing of the image by said second printer.

4. A data processing method for a data communication apparatus, comprising:
   receiving electronic mail data from other data communication apparatus;
   printing, by a printer, an image based on the received electronic mail data;
   transmitting by a notification unit, as electronic mail data, a print completion notification indicating a completion of a printing of the image by said printer, to the other data communication apparatus;
   determining whether or not the received electronic mail data includes print completion notification information, wherein the print completion notification information indicates a completion of a printing which is executed at the other data communication apparatus;
   controlling the notification unit to transmit the print completion notification to the other data communication apparatus in a case where it is determined that the received electronic mail data does not include the print completion notification information;
   preventing the notification unit from transmitting the print completion notification to the other data communication apparatus in a case where it is determined that the received electronic mail data includes the print completion notification information; and
   storing the received electronic mail data in a storage unit in a case where it is determined that the received electronic mail data includes the print completion notification information.

5. A data processing method for a system including a first data communication apparatus and a second data communication apparatus, the data processing method comprising:
   in the first data communication apparatus,
      receiving electronic mail data from other data communication apparatus;
      printing, by a first printer, an image based on the received electronic mail data transmitted from the second data communication apparatus;
      transmitting by a first notification unit, as electronic mail data, a print completion notification indicating a completion of a printing of the image by the first printer;

determining whether or not the received electronic mail data includes print completion notification information, wherein the print completion notification information indicates a completion of a printing which is executed at the other data communication apparatus;
controlling the first notification unit to transmit the print completion notification to the other data communication apparatus in a case where it is determined that the received electronic mail data does not include the print completion notification information;
preventing the first notification unit from transmitting the print completion notification to the other data communication apparatus in a case where it is determined that the received electronic mail data includes the print completion notification information; and storing the received electronic mail data in a storage unit in a case where it is determined that the received electronic mail data includes the print completion notification information; and in the second data communication apparatus,
printing, a second printer, an image based on electronic mail data transmitted from the first data communication apparatus; and
transmit by a second notification unit, as electronic mail data, a print completion notification indicating a completion of a printing of the image by said second printer.

* * * * *